(12) United States Patent  
Nemoto et al.

(10) Patent No.: US 8,930,328 B2  
(45) Date of Patent: Jan. 6, 2015

(54) STORAGE SYSTEM, STORAGE SYSTEM CONTROL METHOD, AND STORAGE CONTROL DEVICE

(71) Applicant: Hitachi, Ltd., Tokyo (JP)

(72) Inventors: Jun Nemoto, Tokyo (JP); Hitoshi Kamei, Sagamihara (JP); Atsushi Sutoh, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 20 days.

(21) Appl. No.: 13/702,219

(22) PCT Filed: Nov. 13, 2012

(86) PCT No.: PCT/JP2012/007265  
§ 371 (c)(1),  
(2) Date: Dec. 5, 2012

(87) PCT Pub. No.: WO2014/076731  
PCT Pub. Date: May 22, 2014

(65) Prior Publication Data  
US 2014/0136491 A1     May 15, 2014

(51) Int. Cl.  
*G06F 7/00*          (2006.01)  
*G06F 17/00*        (2006.01)  
*G06F 17/30*        (2006.01)  
*G06F 3/06*         (2006.01)

(52) U.S. Cl.  
CPC ........ *G06F 17/30156* (2013.01); *G06F 3/0608* (2013.01); *G06F 3/0641* (2013.01); *G06F 3/067* (2013.01); *G06F 3/0673* (2013.01)  
USPC ........................................................ 707/692

(58) Field of Classification Search  
CPC . G06F 3/0608; G06F 3/0641; G06F 11/1453; G06F 17/30156; G06F 17/30303  
See application file for complete search history.

(56) References Cited

U.S. PATENT DOCUMENTS 6,477,544 B1    11/2002    Bolosky et al.  
6,826,724 B1 *   11/2004    Shimada et al. .............. 715/234  
(Continued)

FOREIGN PATENT DOCUMENTS

WO    WO 2010/131292 A1    11/2010

OTHER PUBLICATIONS

Achieving Storage Efficiency through EMC Celerra Data Deduplication—Applied Technology; Mar. 2010; pp. 1-17; EMC Corporation.

(Continued)

*Primary Examiner* — Robert Beausoliel, Jr.  
*Assistant Examiner* — Nicholas Allen  
(74) *Attorney, Agent, or Firm* — Foley & Lardner LLP

(57) ABSTRACT

It is provided a storage system including a storage device for storing data, and a controller for controlling data read/write in the storage device. The controller includes a processor for executing a program, and a memory for storing the program that is executed by the processor. The processor executes deduplication processing for converting a duplicate part of data that is stored in the storage device into shared data, and calculates a distributed capacity consumption, which represents a capacity of a storage area that is used by a user in the storage device, by using a size of the data prior to the deduplication processing and a count of pieces of data referring to the shared data that is referred to by this data.

14 Claims, 20 Drawing Sheets

(56) References Cited

U.S. PATENT DOCUMENTS

| | | | |
|---|---|---|---|
| 7,567,188 B1* | 7/2009 | Anglin et al. | 341/63 |
| 8,140,301 B2* | 3/2012 | Abe et al. | 703/2 |
| 8,375,446 B2* | 2/2013 | Eiland et al. | 726/23 |
| 8,458,425 B2* | 6/2013 | Tamura et al. | 711/166 |
| 2004/0024720 A1* | 2/2004 | Fairweather | 706/46 |
| 2007/0112824 A1* | 5/2007 | Lock et al. | 707/102 |
| 2008/0114806 A1* | 5/2008 | Kosche | 707/104.1 |
| 2008/0270077 A1* | 10/2008 | Ozonat et al. | 702/186 |
| 2009/0132543 A1* | 5/2009 | Chatley et al. | 707/10 |
| 2009/0144183 A1* | 6/2009 | Gatchell et al. | 705/34 |
| 2010/0100774 A1* | 4/2010 | Ding et al. | 714/45 |
| 2010/0107255 A1* | 4/2010 | Eiland et al. | 726/23 |
| 2010/0169287 A1* | 7/2010 | Klose | 707/692 |
| 2010/0332454 A1* | 12/2010 | Prahlad et al. | 707/654 |
| 2010/0333116 A1* | 12/2010 | Prahlad et al. | 719/328 |
| 2011/0029469 A1* | 2/2011 | Yamada | 706/14 |
| 2011/0078112 A1* | 3/2011 | Takata et al. | 707/622 |
| 2011/0093409 A1* | 4/2011 | Tamura et al. | 705/400 |
| 2011/0138144 A1* | 6/2011 | Tamura et al. | 711/166 |
| 2011/0179247 A1* | 7/2011 | Mine et al. | 711/171 |
| 2011/0271146 A1* | 11/2011 | Mork et al. | 714/37 |
| 2011/0302194 A1* | 12/2011 | Gonzalez et al. | 707/769 |
| 2012/0060142 A1* | 3/2012 | Fliess et al. | 717/102 |
| 2012/0144149 A1* | 6/2012 | Aronovich et al. | 711/171 |
| 2012/0254333 A1* | 10/2012 | Chandramouli et al. | 709/206 |
| 2012/0271868 A1* | 10/2012 | Fukatani et al. | 707/822 |
| 2013/0073490 A1* | 3/2013 | Baughman et al. | 706/13 |
| 2013/0073806 A1* | 3/2013 | Xavier et al. | 711/114 |
| 2013/0138428 A1* | 5/2013 | Chandramouli et al. | 704/9 |
| 2013/0159248 A1* | 6/2013 | Mueller | 707/609 |
| 2013/0212074 A1* | 8/2013 | Romanski et al. | 707/692 |
| 2013/0245793 A1* | 9/2013 | Akiyama et al. | 700/79 |
| 2013/0326176 A1* | 12/2013 | Bachar et al. | 711/162 |
| 2014/0040580 A1* | 2/2014 | Kripalani | 711/162 |

OTHER PUBLICATIONS

PCT International Search Report and Written Opinion on application PCT/JP2012/007265 mailed Jul. 12, 2013; 8 pages.

* cited by examiner

Fig. 6

HASH MANAGEMENT TABLE 600

| HASH VALUE (610) | ORIGINAL FILE ID (620) | STUB FILE ID LIST (630) |
|---|---|---|
| c59548c3c5762284 | 500 | 200, 300, 400 |
| 86a1f0037eb16a1b | 600 | 700 |
| ... | ... | |

Fig. 7

QUOTA MANAGEMENT TABLE 700

| USER ID (710) | PHYSICAL CAPACITY CONSUMPTION (720) | LOGICAL CAPACITY CONSUMPTION (730) | DISTRIBUTED CAPACITY CONSUMPTION (740) | QUOTA (750) |
|---|---|---|---|---|
| root | 12MB | - | - | 30GB |
| john | 0MB | 24MB | 8MB | 30GB |
| doe | 6MB | 15MB | 7MB | 30GB |
| | | | | |
| | | | | |

CHARGE MANAGEMENT TABLE (2130)

| USER ID (2210) | UNIT CAPACITY COST (2220) | ESTIMATED CHARGE (2230) |
|---|---|---|
| john | 1 $/GB | $ 3 |
| doe | 0.5 $/GB | $ 4.5 |
|  |  |  |

STORAGE SYSTEM, STORAGE SYSTEM CONTROL METHOD, AND STORAGE CONTROL DEVICE

TECHNICAL FIELD

This invention relates to a storage system.

BACKGROUND ART

The rapid increase in the amount of data stored in storage systems (such as file servers) has led to an increase in the number and sizes of disks connected to a file server, thereby increasing the cost required to introduce and maintain the disks. In order to reduce this cost, deduplication technologies with which the amount of data saved on a file server is reduced are attracting attention. Main deduplication technologies are classified into block-level deduplication in which duplicates are eliminated on a block-by-block basis and file-level deduplication in which duplicates are eliminated on a file-by-file basis.

File-level deduplication, which is lighter in load than block-level deduplication, is often applied to primary file servers from which high performance is demanded. Common methods of carrying out file-level deduplication are described in Patent Literature 1 and Non Patent Literature 1. A technology described in Non Patent Literature 1, for example, copies a file that matches a policy for selecting a deduplication target to a hidden area of a file system. This file is then converted into a stub file by leaving a reference to its original file which has been copied and freeing up a data block that the file has been using. From then on, when a file that matches the policy is determined as identical to the original file which has already been copied to the hidden area, this file is converted into a stub file to eliminate duplication.

File servers generally have a quota function for limiting the amount of data that a user using the file server is allowed to store in order to manage the cost of data storage appropriately. As a way to provide the quota function to a file server that has a deduplication function, Non Patent Literature 1 describes two methods, one based on the logical capacity consumption and one based on the physical capacity consumption.

In the method based on the logical capacity consumption, the capacity consumption of a user is the logical size of files owned by the user. This method accordingly counts in the logical size of a file that has been processed by deduplication as well even though the file no longer consumes a physical data block. The method based on the physical capacity consumption, on the other hand, counts the size of a physical data block that is actually consumed as the capacity consumption of a user.

CITATION LIST

Patent Literature

PTL 1: U.S. Pat. No. 6,477,544B1

Non Patent Literature

NPL 1: EMC Corporation, "Achieving Storage Efficiency through EMC Celerra Data Deduplication", March 2010

SUMMARY OF INVENTION

Technical Problem

These quota function providing methods, however, have problems. First, with the method based on the logical capacity consumption, end users who contribute to capacity consumption reduction through deduplication of many files do not benefit from the reduction. Rather, deduplication has a possibility of deteriorating file read and file write performance. In the method based on the physical capacity consumption, where a data block that a file processed by deduplication has been using is freed up and only a reference to its original file is left, the capacity consumption of the owner of this file is reduced. The resultant problem is that the file is counted in as the capacity consumption of the owner of the original file but is not counted in as the capacity consumption of the owner of a stub file that has been generated as a result of the deduplication.

This invention has been made in view of the above-mentioned problems, and it is an object of this invention to give benefits of deduplication back to end users who contribute to deduplication by appropriately counting the capacity consumption of the owner of a file processed by deduplication in capacity management of a file server that has a deduplication function.

Solution to Problem

An exemplary embodiment of the invention disclosed herein uses the size of data prior to duplication elimination processing and the number of pieces of data referring to shared data that is referred to by this data to calculate the distributed capacity consumption of this data.

Specifically, according to the exemplary embodiment of the invention disclosed herein, there is provided a storage system comprising a storage device for storing data, and a controller for controlling data read/write in the storage device. The controller includes a processor for executing a program, and a memory for storing the program that is executed by the processor. The processor executes deduplication processing for converting a duplicate part of data that is stored in the storage device into shared data, and calculates a distributed capacity consumption, which represents a capacity of a storage area that is used by a user in the storage device, by using a size of the data prior to the deduplication processing and a count of pieces of data referring to the shared data that is referred to by this data.

Advantageous Effects of Invention

According to the exemplary embodiment of this invention, the capacity consumption of the owner of a file processed by deduplication can be counted appropriately.

Other objects, configurations, and effects than those described above become clear through the following description of embodiments.

BRIEF DESCRIPTION OF DRAWINGS

FIG. 6 is a diagram illustrating an example of a configuration of a hash management table according to the first embodiment of this invention.

FIG. 7 is a diagram illustrating a configuration example of a quota management table according to the first embodiment of this invention.

DESCRIPTION OF EMBODIMENTS

Embodiments of this invention are described below with reference to the accompanying drawings, taking as an example a file server that has a deduplication function. However, the embodiments are merely an example of carrying out this invention, and are not to limit the technical scope of this invention.

Example 1

Figure 1:
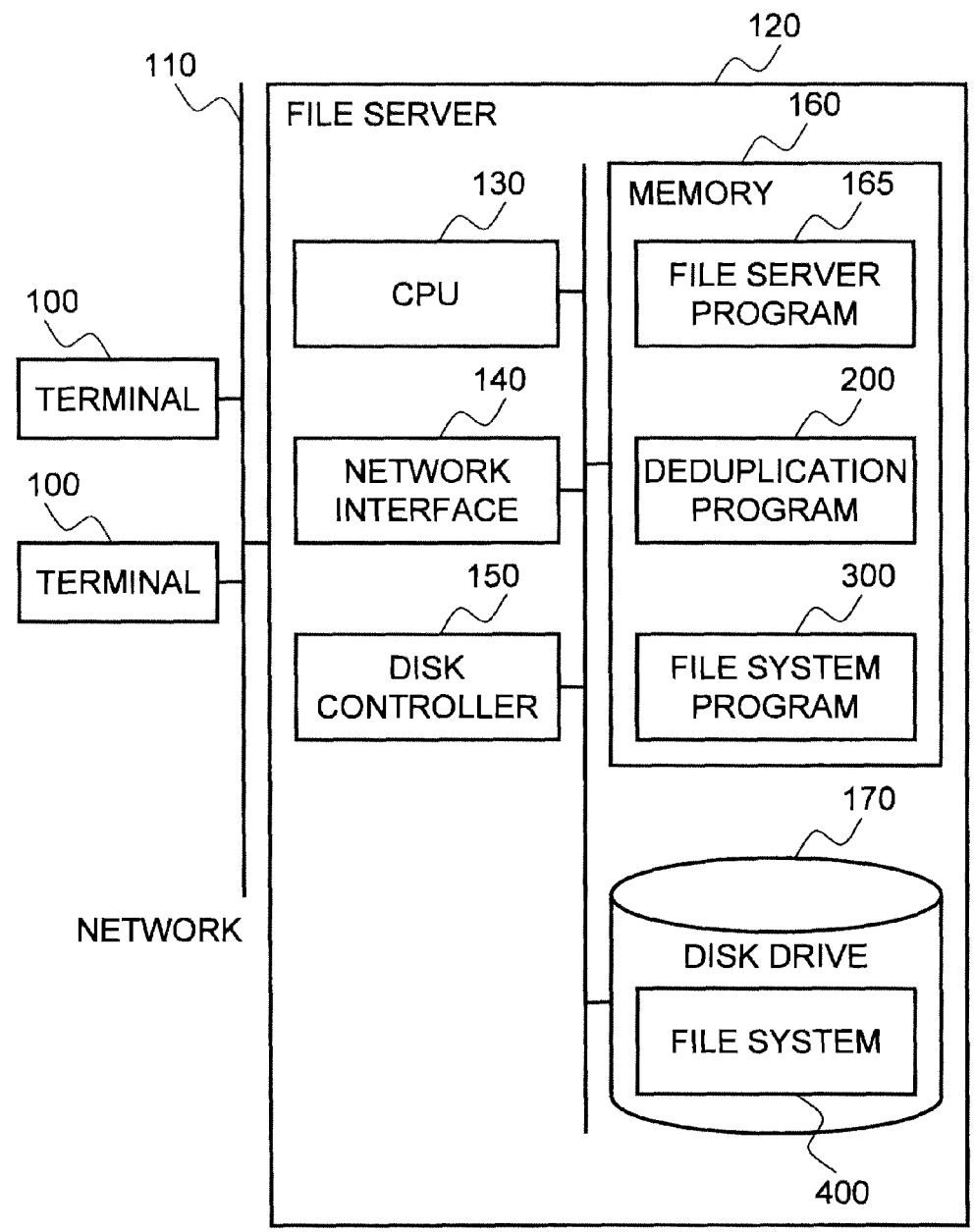
FIG. 1 is a block diagram illustrating a configuration of a computer system according to a first embodiment of this invention.

FIG. 1 is a block diagram illustrating a configuration of a computer system according to a first embodiment.

The computer system of the first embodiment includes at least one terminal 100 and at least one file server 120. The at least one file server 120 is coupled to the at least one terminal 100 via a network 110.

The terminal 100 is a computer used by a user to utilize a file sharing service provided by the file server 120, and includes a processor for executing a program and a memory for storing the program. A client program which communicates to/from a file server program 165, a console program which is used in management of the file server 120, and the like are executed on the terminal 100.

The network 110 is a network that couples the terminal 100 and the file server 120 to each other, and is a local area network (LAN), for example.

The file server 120 is a computer that provides a file sharing service to end users. The file server 120 includes a processor (CPU) 130, a network interface 140, a disk controller 150, a memory 160, and a disk drive 170. The processor 130 executes a program stored in the memory 160. The network interface 140 controls communication to/from the terminal 100. The disk controller 150 controls data input/output to/from the disk drive 170. The disk drive 170 stores data provided by the file sharing service. These components are connected by an internal communication path (a bus, for example).

The memory 160 stores programs and data. For instance, the memory 160 stores the file server program 165, a deduplication program 200, and a file system program 300.

The file server program 165 is a program that provides a file sharing service to end users by making a part of, or the entirety of, a file system 400 open to the terminal 100 as a "share". Examples of the file sharing service include Common Internet File System (CIFS) or Network File System (NFS).

The deduplication program 200 is a program for reducing capacity consumption by eliminating duplicates of a file that is stored in the file system 400 in cooperation with the file system program 300.

The file system program 300 is a program for managing the file system 400, which is stored in the disk drive 170.

The disk controller 150 inputs/outputs data stored in the disk drive 170 on, for example, a block-by-block basis, based on input/output requests of the programs stored in the memory 160.

The disk drive 170 is a storage device for storing data that is read/written by the programs stored in the memory 160, and stores the file system 400.

The disk drive 170 included in the file server 120 may be a single disk drive connected directly to the file server 120, or may be a disk drive that is run on a disk array device coupled to a SAN and that is connected to the file server 120 via a disk interface. The disk drive 170 may also be a Redundant Array of Inexpensive Disks (RAID) which accomplishes redundancy with the use of a plurality of storage devices. The storage device used as the disk drive 170 can be a magnetic disk drive, a semiconductor storage device (SSD), or the like.

Figure 2:
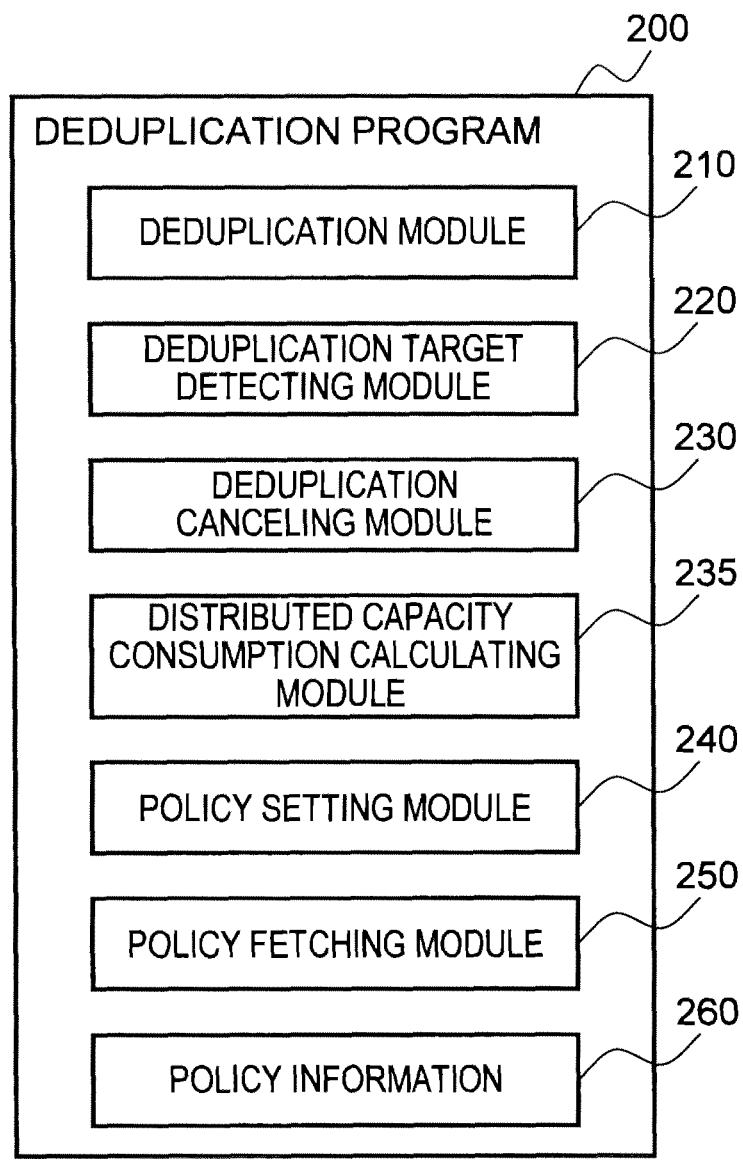
FIG. 2 is a block diagram illustrating functional configuration of a deduplication program according to the first embodiment of this invention.

FIG. 2 is a block diagram illustrating functional configuration of the deduplication program 200.

The deduplication program 200 includes a deduplication module 210, a deduplication target detecting module 220, a deduplication canceling module 230, a distributed capacity consumption calculating module 235, a policy setting module 240, a policy fetching module 250, and policy information 260.

The deduplication module 210 is executed by the processor 130 of the file server 120 when instructed by a system administrator, or on a predetermined schedule. The deduplication program 200 turns a deduplication target file, which is detected by the deduplication target detecting module 220, into a stub file to eliminate duplication.

The deduplication target detecting module 220 is executed by the processor 130 of the file server 120 with a call from the deduplication module 210 as a trigger. The deduplication target detecting module 220 scans files stored in the file system 400 based on the policy information 260, which is set by the system administrator via the policy setting module 240, and detects a deduplication target file.

The deduplication canceling module 230 is executed by the processor 130 of the file server 120 when instructed by a system administrator, or on a predetermined schedule. The deduplication canceling module 230 writes data back to a file that has been turned into a stub file through deduplication, to thereby restore the stub file to a normal file.

The distributed capacity consumption calculating module 235 is executed by the processor 130 of the file server 120 with a call from the deduplication module 210 or a call from the deduplication canceling module 230 as a trigger. The distributed capacity consumption calculating module 235 updates a quota management table 700 based on the file size of one file and the count of files that have a deduplication relation with the one file (stub files).

The policy setting module 240 is executed by the processor 130 of the file server 120 with an instruction from the system administrator as a trigger. The policy setting module 240 displays a policy setting window on the terminal 100 in the form of, for example, a graphical user interface (GUI), receives an input from the system administrator, and sets the policy information 260 for determining a deduplication target based on the received input. The interface for receiving an input from the system administrator may be a command line interface (CLI).

The policy fetching module 250 is executed by the processor 130 of the file server 120 with a request from the deduplication target detecting module 220 or a request from the policy setting module 240 as a trigger. The policy fetching module 250 returns the policy information 260 that is currently set.

The policy information 260 is a condition for determining a deduplication target. The policy information 260 is used to, for example, select a particular type of file as a deduplication target by specifying a file extension such as "zip", or to select as a target a large-sized file by specifying a file size, e.g., "a file 1 GB or larger", or to select as a target an infrequently used file, e.g., "a file that has not been accessed for a month or longer". The conditions may be used in combination.

Figure 3:
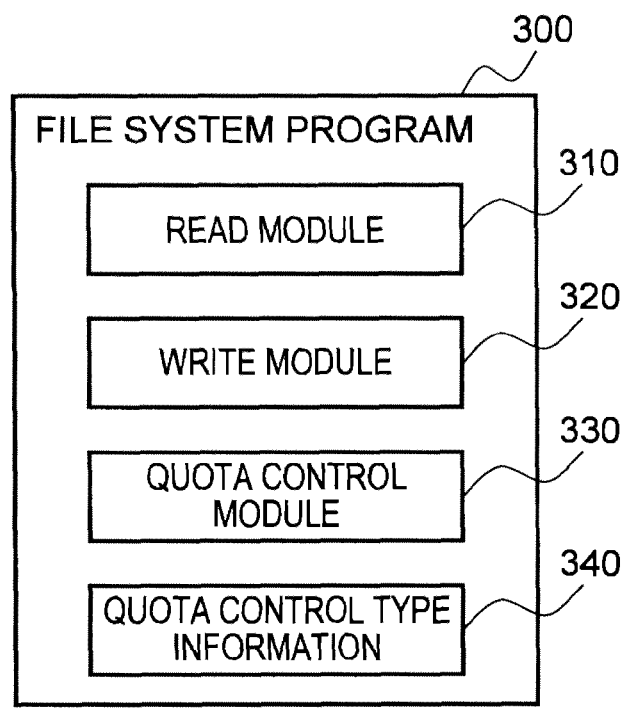
FIG. 3 is a block diagram illustrating functional configuration of a file system program according to the first embodiment of this invention.

FIG. 3 is a block diagram illustrating functional configuration of the file system program 300.

The file system program 300 includes a read module 310, a write module 320, a quota control module 330, and quota control type information 340.

The read module 310 is executed by the processor 130 of the file server 120 with a read request as a trigger. A read request is issued by the file server program 165 to the file system program 300 when, for example, a user using the file sharing service reads data of a file stored in the file system 400. The read module 310 accesses the file based on the identifier and offset of the file, reads the data, and sends the data in response to the file server program 165 which has issued the read request. In the case where the file to be read is a stub file generated as a result of deduplication, the read module 310 traces back to its original file to read the desired data.

The write module 320 is executed by the processor 130 of the file server 120 with a write request as a trigger. A write request is issued by the file server program 165 to the file system program 300 when, for example, a user using the file sharing service writes data to a file stored in the file system 400. The write module 320 accesses the file based on the identifier and offset of the file, and writes the data. In the case where a data block is newly needed, the write module 320 calls the quota control module 330 to confirm that the quota of the user who has issued the write request is not exceeded by writing the data, and then writes the data.

The quota control module 330 is executed by the processor 130 of the file server 120 with a call from the write module 320 as a trigger. The quota control module 330 refers to the quota control type information 340 to determine which value out of physical capacity consumption, logical capacity consumption, and distributed capacity consumption is to be used in quota control. The quota control module 330 then refers to the quota management table 700 to determine, for a user who has issued a write request, whether the determined value does not exceed the quota of the user. The quota control module 330 also provides a user interface for changing the quota control type information 340.

The quota control type information 340 indicates the type of capacity consumption that is used in quota control by the quota control module 330 out of types of capacity consumption managed by the quota management table 700. This embodiment describes a case where the quota control type information 340 is set to distributed capacity consumption.

Figure 4:
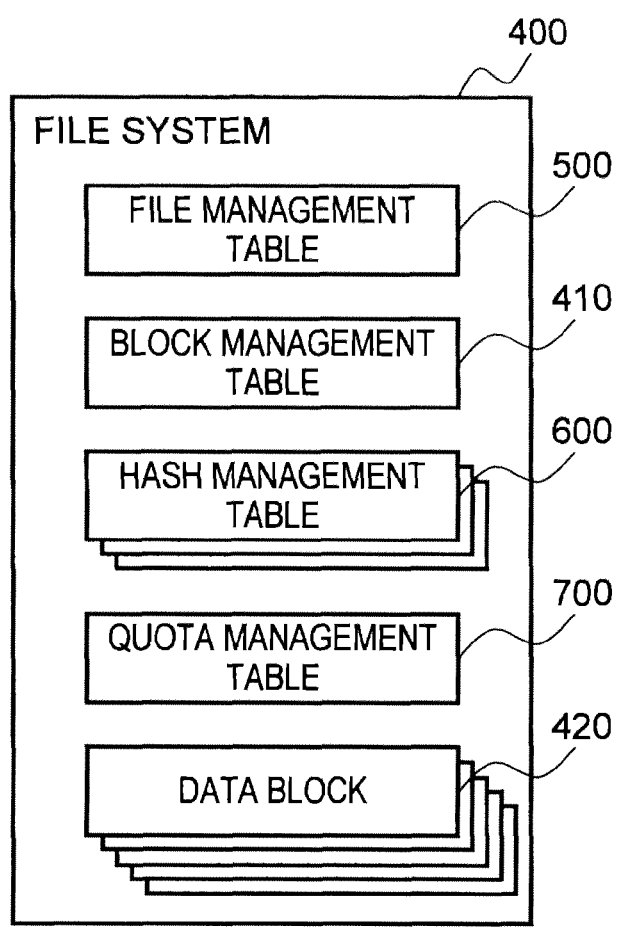
FIG. 4 is a block diagram illustrating a configuration example of a file system according to the first embodiment of this invention.

FIG. 4 is a block diagram illustrating a configuration example of the file system 400.

The file system 400 includes a file management table 500, a block management table 410, a hash management table 600, the quota management table 700, and data blocks 420.

The file management table 500 is a table for managing an identifier with which a file is identified uniquely and metadata, and is used in a file search, among others. Directories are also managed in the file management table 500, though the table name says "file" for the convenience of description.

The block management table 410 is a table for managing the block addresses of the data blocks 420 which constitute data of a file or a directory, and is referred to from entries of the file management table 500. The block management table 410 is used in read processing, write processing, and the like.

The hash management table 600 is a table for managing the hash value of a file turned into a stub file and a file identifier, and is used in, among others, a search for a file that matches a deduplication target file.

The quota management table 700 is a table for managing, for each user, the association between the amount of use of the file system 400 and an upper limit to the capacity that the user is allowed to use, namely, a quota, and is used in quota control, among others.

The data blocks 420 are referred to from the block management table 410 and constitute data of a file or a directory.

Figure 5:
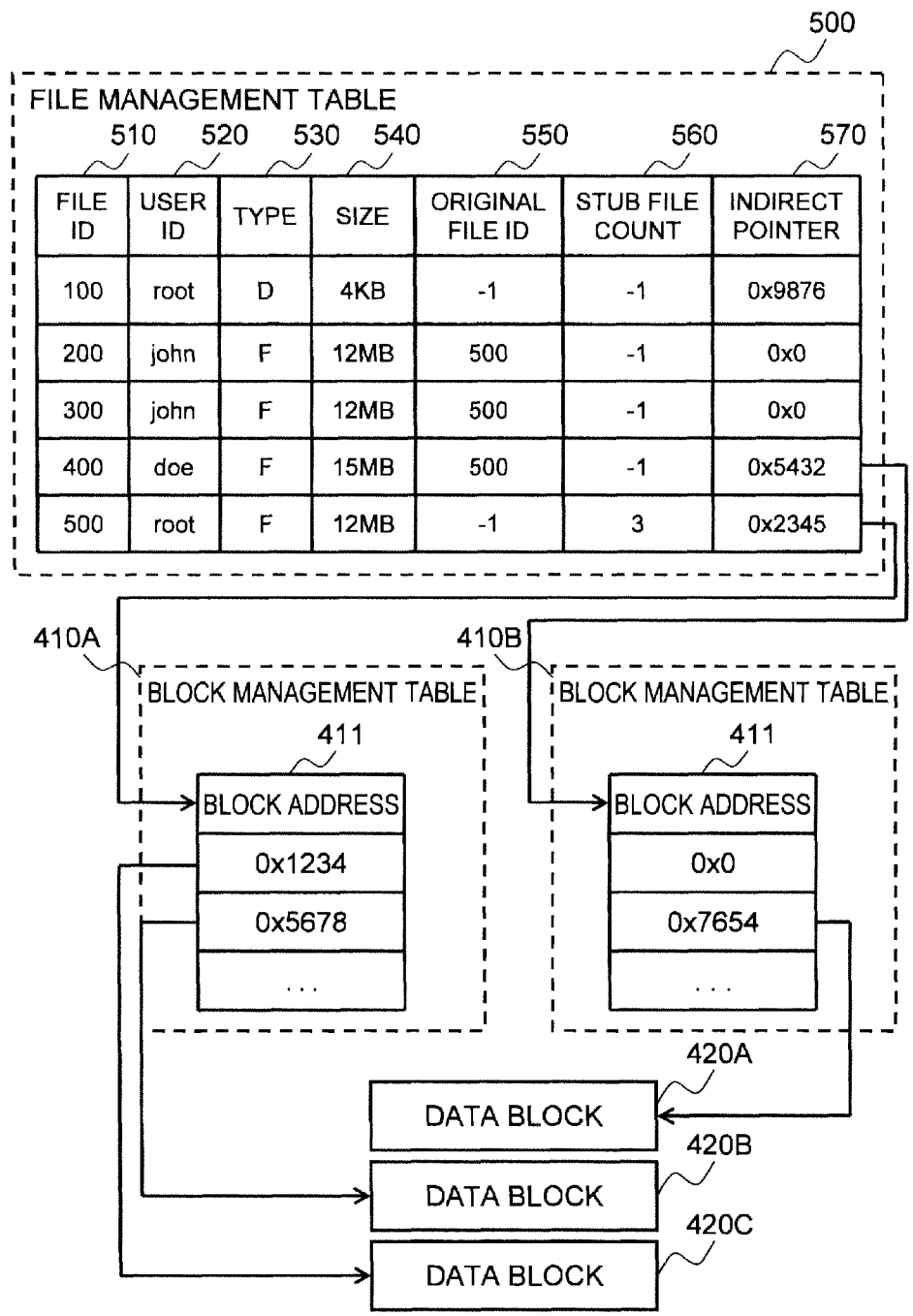
FIG. 5 is a diagram illustrating an example of a configuration of a management table, a block management table, and a data blocks according to the first embodiment of this invention.

FIG. 5 is a diagram illustrating an example of a configuration of the file management table 500, the block management tables 410, and the data blocks 420, and a relation to one another.

The file management table 500 is configured so that one entry is constituted of a file ID 510, a user ID 520, a type 530, a size 540, an original file ID 550, a stub file count 560, and an indirect pointer 570. The file management table 500 may additionally hold various types of metadata about a file such as a last access time, a last update time, and access control information. One entry of the file management table 500 corresponds to one file or one directory.

The file ID 510 is identification information for uniquely identifying a file. The user ID 520 is identification information for uniquely identifying the owner of the file. The type 530 is information for type discrimination between a file and a directory. The size 540 is the logical size of the file. The original file ID 550 is identification information for identifying the original file of the file in question when the file in question is a stub file. The stub file count 560 is the count of stub files that are in a deduplication relation with the file in question when the file in question is an original file. The indirect pointer 570 indicates an address on a disk that is registered in the block management table 410.

Stored as the type 530 is a numerical value or an identifier that is designed for file type discrimination. For instance, in this embodiment, "D" is stored in the case of a directory and "F" is stored in the case of a file. However, the type 530 can take any form as long as file types can be discriminated from one another.

In the case where the file in question is a stub file generated as a result of applying deduplication, the ID of an original file where the original data of the stub file is stored is stored as the original file ID 550. In the case where the file in question is a normal file to which deduplication is not applied, "−1" is stored as the original file ID 550.

In the case where the file in question is an original file which has been processed by deduplication, an integer equal to or larger than 1 is stored as the stub file count 560. Otherwise, "−1" is stored as the stub file count 560.

The block management table 410 has as an entry a block address 411, which is the address on a disk of the data block 420 in question. The block management table 410 is provided for each file and for each directory to manage a plurality of data blocks 420 that constitute the file or directory in question.

The data blocks 420 constitute data of a file or a directory. A file and a directory are each constituted of 0 or more data blocks. The data blocks 420 of a file are user data itself which is written by the file server program 165 and the file system program 300. The data blocks 420 of a directory store a list of combinations of a file ID and a name directly under the directory.

In FIG. 5, for example, an entry of the file management table 500 for a file whose file ID is "500" refers to a block management table 410A. The first entry of the block management table 410A refers to a data block 420C, and the second entry thereof refers to a data block 420B. In other words, the file having a file ID "500" is constituted of the data blocks 420C and 420B, and others.

The indirect pointer 570 is "0x0" for a file that has a file ID "200" and a file that has a file ID "300". A file in which every piece of data is the same as that of its original file is not provided with the block management table 410, and has "0x0" stored as the indirect pointer 570.

A file that has a file ID "400" is a stub file, and refers to the block management table 410 via the indirect pointer 570. This indicates that data of the stub file is partially the same as data of its original file and partially differs from the data of the original file. For example, an entry where "0x0" is stored, such as the first entry of the block management table 410B, refers to a data block indicated by a block address that is stored in an entry for the original file that has the same offset.

FIG. 6 is a diagram illustrating an example of a configuration of the hash management table 600.

The hash management table 600 is configured so that one entry is constituted of a hash value 610, an original file ID 620, and a stub file ID list 630. The hash value 610 is the hash value of an original file which has been detected as a deduplication target and copied to a hidden area. The original file ID 620 is identification information for uniquely identifying the original file. The stub file ID list 630 is a list of pieces of identification information of stub files that are in a deduplication relation with the original file.

FIG. 7 is a diagram illustrating a configuration example of the quota management table 700.

The quota management table 700 is configured so that one entry is constituted of a user ID 710, physical capacity consumption 720, logical capacity consumption 730, distributed capacity consumption 740, and a quota 750.

The user ID 710 is identification information for uniquely identifying a user. The physical capacity consumption 720 is capacity consumption based on physical data blocks that the user in question uses. The logical capacity consumption 730 is capacity consumption based on the logical size of flies that the user in question owns. The distributed capacity consumption 740 is capacity consumption calculated based on the count of stub files of a file to which deduplication has been applied and the size of the original file. The quota 750 is an upper limit to the capacity consumption of the user in question.

Figure 8:
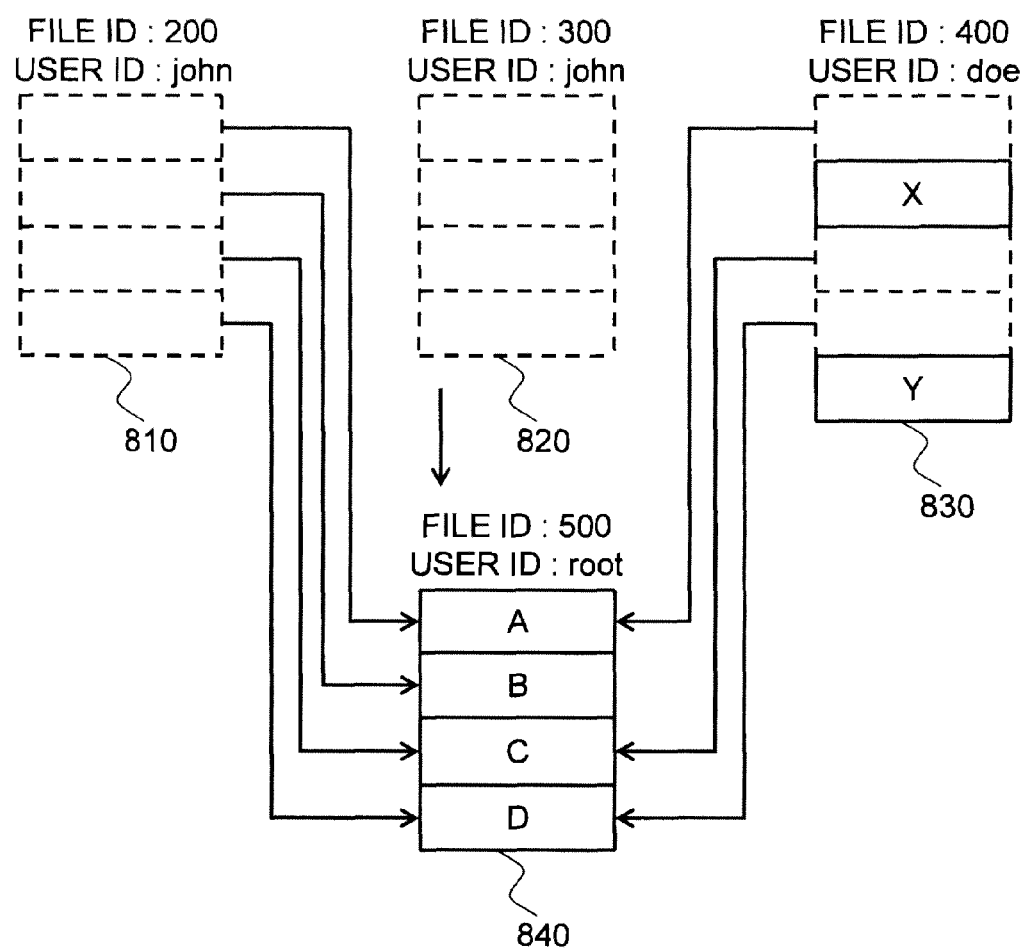
FIG. 8 is a diagram illustrating a deduplication relation between stub files and their original file according to the first embodiment of this invention.

FIG. 8 is a diagram illustrating a deduplication relation between stub files and their original file.

A file 810, which has a file ID "200", a file 820, which has a file ID "300", and a file 830, which has a file ID "400" are all in a deduplication relation with an original file 840, which has a file ID "500". In the file 810 and the file 820, all pieces of data are the same as in the original file 840, which are "A", "B", "C", and "D". In the file 830, on the other hand, the second piece of data is rewritten with "X" and the fifth piece of data "Y" is added. The rest of the data refers to the data of the original file 840, which gives the file 830 data "A", "X", "C", "D", and "Y".

The respective owners and capacity consumption of the files of FIG. 8 correspond to what is registered in the quota management table 700 (FIG. 7). The pieces of data "A", "B", "C", "D", "X", and "Y" are each 3 MB, the files whose file IDs are "200", "300", and "500" each have a logical file size of 12 MB, and the logical file size of the file whose file ID is "400" is 15 MB.

A user "john" owns the file 810 and the file 820. These files are both stub files generated as a result of deduplication and do not consume physical data blocks. The physical capacity consumption 720 of "john" is therefore 0 MB. The logical capacity consumption 730 of "john", however, is 24 MB because the logical size of a file is counted as logical capacity consumption irrespective of whether or not the file is a stub file. The count of files that are in a deduplication relation with the original file 840 is "3" and the size of the original file is 12 MB. For each of the file 810 and the file 820, 4 MB of capacity consumption which is obtained by dividing 12 MB by 3 is therefore counted as the distributed capacity consumption 740. The distributed capacity consumption 740 of "john" is consequently 8 MB.

A user "doe" owns the file 830. The file 830 is a stub file generated as a result of deduplication, but "doe" has rewritten the second piece of data with "X" and added the fifth piece of data "Y" after the deduplication. These pieces of data consume physical data blocks as a differential from the original file 840, which makes the physical capacity consumption 720 of "doe" 6 MB. The logical capacity consumption 730 of "doe" is 15 MB because the logical file size of the file 830 is 15 MB. The distributed capacity consumption 740 of "doe" is 7 MB, which is obtained by adding the size of the additional data "Y" to 4 MB calculated based on the count of files that are in a deduplication relation and the size of the original size as described above.

A file owned by an internal system user "root" does not make a deduplication target in principle, and only the physical capacity consumption 720 is calculated for "root". In the example of FIGS. 7 and 8, the physical capacity consumption 720 of "root" is 12 MB because the pieces of data "A", "B", "C", and "D" of the file 840, which has been moved to a hidden area as the original file, consume physical data blocks.

Figure 9:
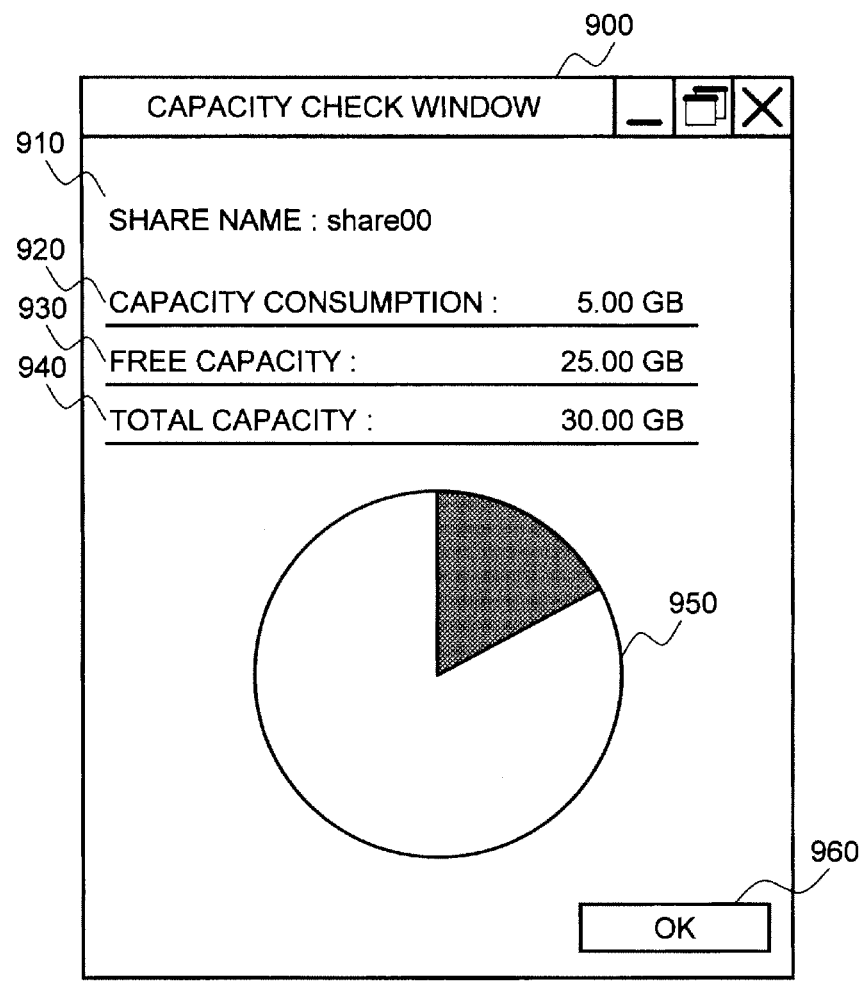
FIG. 9 is a diagram illustrating an example of a capacity check window according to the first embodiment of this invention.

FIG. 9 is a diagram illustrating an example of a capacity check window 900, which is displayed on the terminal 100.

The capacity check window 900 is a window that is displayed by the client program of the terminal 100 based on file system capacity consumption and a quota that are provided on a user-by-user basis via the file server program 165. The capacity check window 900 is used by an end user to check a file system capacity that is available to the end user.

The capacity check window 900 includes display fields for a share name 910, capacity consumption 920, a free capacity 930, and a total capacity 940, a graph 950, and an OK button 960. The share name 910 is the name of a share made open by the file server program 165. The capacity consumption 920 is the amount of data that is currently used by the user mounted to the share. The free capacity 930 is a capacity that remains available to the user in question out of the user's quota. The total capacity 940 is the quota of the user in question. The graph 950 shows the relation between the capacity consumption 920 and the free capacity 930. The OK button 960 is a button operated by the end user when the user finishes checking.

A description is given below with reference to FIGS. 10 to 16 on processing flows of the file sharing service function, the deduplication function, and the quota function that are provided by the file server 120 in this embodiment.

Figure 10:
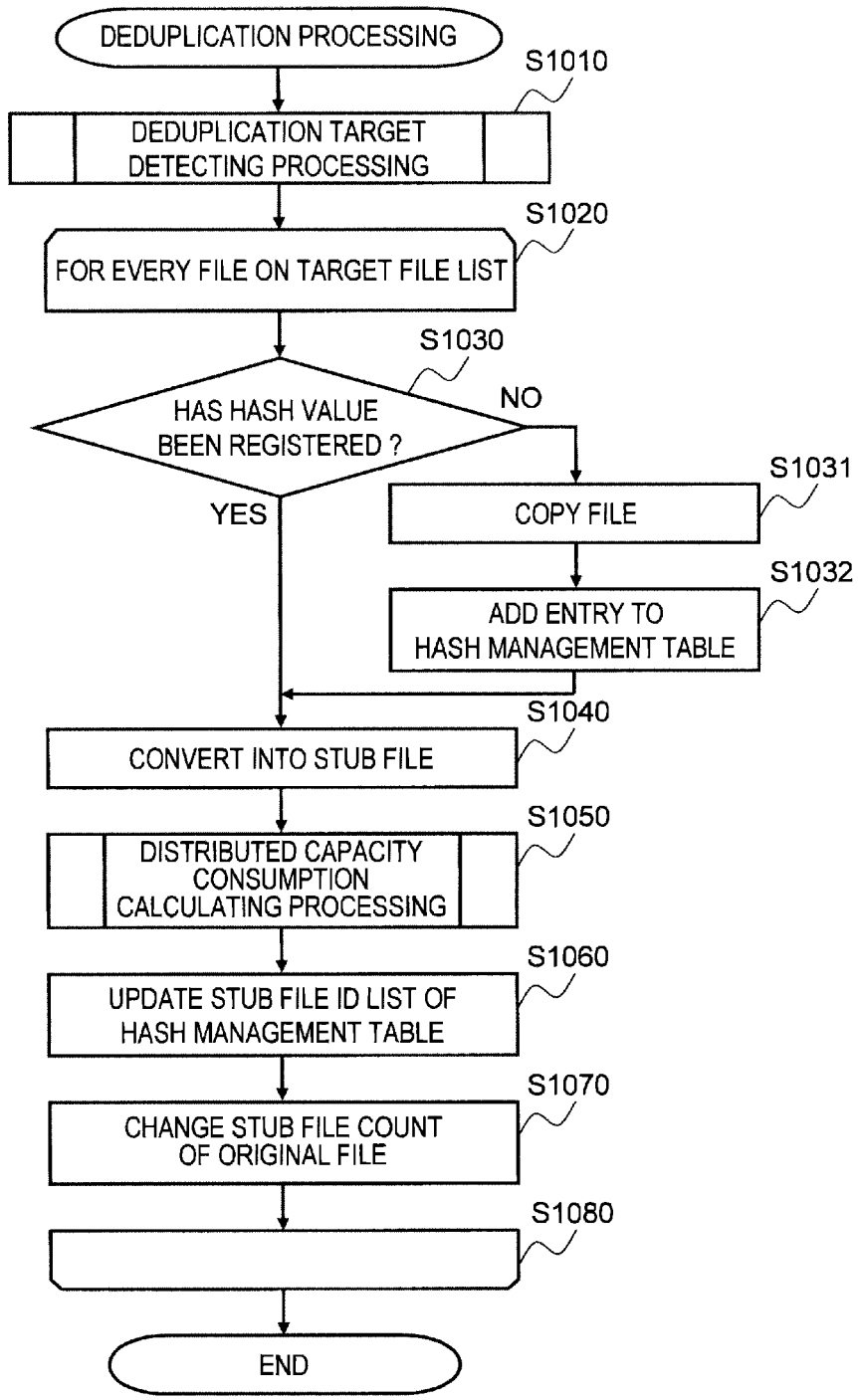
FIG. 10 is a flow chart of an example of the deduplication processing according to the first embodiment of this invention.

FIG. 10 is a flow chart of an example of the deduplication processing.

The deduplication processing illustrated in FIG. 10 is processing that is executed by the deduplication module 210 in cooperation with the processor 130, and is executed when instructed by the system administrator, or on a predetermined schedule.

The deduplication module 210 first calls deduplication target detecting processing to obtain a list of deduplication target files (S1010). Details of the deduplication target detecting processing are described later with reference to FIG. 11.

The deduplication module 210 next executes S1020 to S1080 for every file on the target file list.

Specifically, the deduplication module 210 first calculates the hash value of a target file and determines whether or not the calculated hash value has been registered in the hash management table 600 (S1030).

In the case where the calculated hash value has been registered (YES in S1030), it means that there is already an original file identical to the target file. The deduplication module 210 therefore converts the target file into a stub file that refers to the original file (S1040). Specifically, the deduplication module 210 first frees up all data blocks 420 that have been used by the target file, and stores "0x0" as the indirect pointer 570 in an entry of the file management table 500 for the target file. The deduplication module 210 further stores, as the original file ID 550, the original file ID 620 of an entry of the hash management table 600 that has the hash value of the target file. An adjustment of the distributed capacity consumption that accompanies the conversion to a stub file is done in distributed capacity consumption calculating processing, which is described later, and the size of the freed up data blocks 420 is therefore not counted at this point.

The deduplication module 210 then calls the distributed capacity consumption calculating processing using, as arguments, the file ID 510 of the target file, the size 540 of the original file, the stub file count 560 of the original file (the current stub file count), a value obtained by adding 1 to the stub file count 560 of the original file (the changed stub file count), and a deduplication cancellation flag set to "false", and updates the quota management table 700 (S1050). Details of the distributed capacity consumption calculating processing are described later with reference to FIG. 13.

The deduplication module 210 then adds the file ID 510 of the target file to the stub file ID list 630 of an entry in the hash management table 600 that has the hash value of the target file (S1050).

The deduplication module 210 adds 1 to the stub file count 560 of the original file (S1070), and ends the processing for this target file (S1080).

In the case where the hash value has not been registered (NO in S1030), it means that there is no original file identical to the target file. The deduplication module 210 therefore copies the target file to a hidden area (S1031). The hidden area is, for example, a directory that cannot be accessed by general users or other such area. The owner of the file copied to the hidden area is changed to a system user (for example, "root").

The deduplication module 210 then calculates the hash value of the copied file to add an entry that has the calculated hash value and the file ID 510 of the copied file to the hash management table 600 (S1032). The subsequent processing is the same as in the case where the hash value has been registered (YES in S1030).

Figure 11:
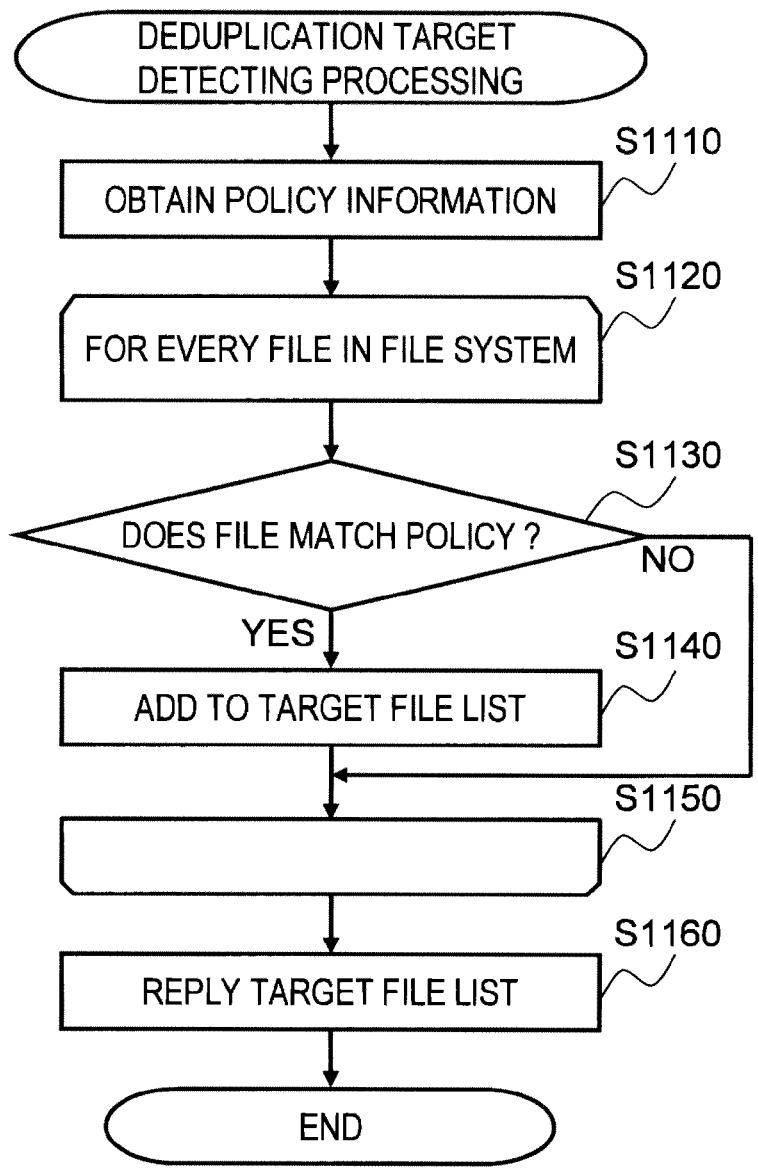
FIG. 11 is a flow chart of an example of the deduplication target detecting processing according to the first embodiment of this invention.

FIG. 11 is a flow chart of an example of the deduplication target detecting processing.

The deduplication target detecting processing illustrated in FIG. 11 is processing that is executed by the deduplication target detecting module 220 in cooperation with the processor 130, and is executed with a call from the deduplication module 210 as a trigger.

The deduplication target detecting module 220 first obtains the policy information 260 (S1110). The policy information 260 is a condition for determining a deduplication target file, for example, "a file that has not been accessed for three months and that is equal to or larger than 100 MB".

The deduplication target detecting module 220 next executes S1120 to S1150 for every file in the file system 400.

Specifically, the deduplication target detecting module 220 determines for each file whether or not the file matches the policy information 260 obtained in S1110 (S1130). The determination uses information held in an entry of the file management table 500 for the file in question.

In the case where the file matches the policy information 260 (YES in S1130), the deduplication target detecting module 220 adds the file ID 510 to a deduplication target file list (S1140), and ends the processing for this file (S1150).

In the case where the file does not match the policy information 260 (NO in S1130), on the other hand, the deduplication target detecting module 220 ends the processing for this file without doing anything (S1150).

After finishing processing every file in the file system 400, the deduplication target detecting module 220 replies the target file list to the deduplication module 210 (S1160).

Figure 12:
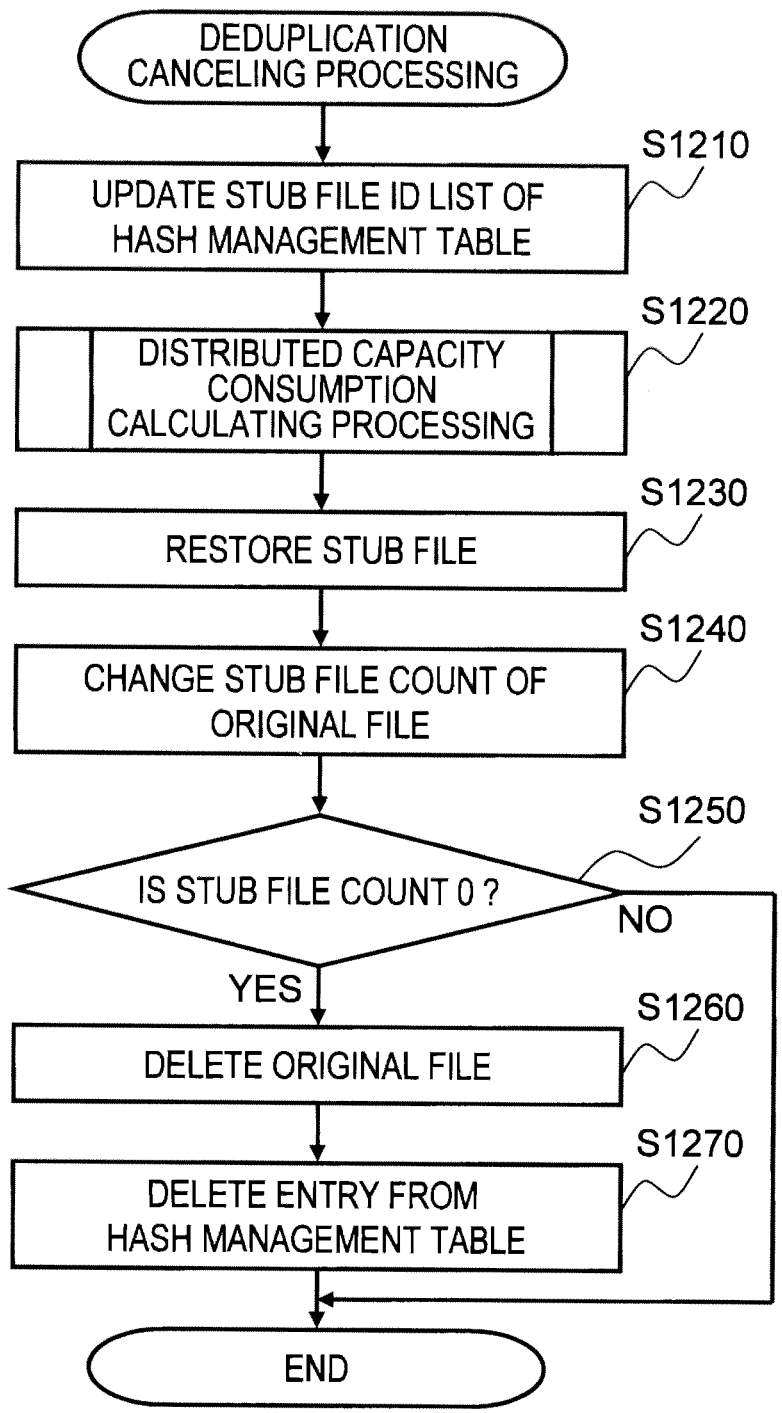
FIG. 12 is a flow chart of an example of the deduplication canceling processing according to the first embodiment of this invention.

FIG. 12 is a flow chart of an example of the deduplication canceling processing.

The deduplication canceling processing illustrated in FIG. 12 is processing that is executed by the deduplication canceling module 230 in cooperation with the processor 130, and is executed when instructed from the system administrator. The deduplication canceling processing is also executed automatically when a predetermined condition is met. The predetermined condition is, for example, a differential between the data amount of a stub file and the data amount of its original file reaching a given value. The deduplication canceling module 230 specifies the file ID 510 of a file for which deduplication is to be cancelled (a stub file generated as a result of deduplication) in executing the deduplication canceling processing.

The deduplication canceling module 230 first searches the hash management table 600 with the original file ID 550 of the specified stub file as a key, and deletes the file ID 510 of the specified stub file from the stub file ID list 630 (S1210).

The deduplication canceling module 230 next calls the distributed capacity consumption calculating processing using, as arguments, the file ID 510 of the target file, the size 540 of the original file, the stub file count 560 of the original file (the current stub file count), a value obtained by subtracting 1 from the stub file count 560 of the original file (the changed stub file count), and a deduplication cancellation flag set to "true", and updates the quota management table 700 (S1220). Details of the distributed capacity consumption calculating processing are described later with reference to FIG. 13.

The deduplication canceling module 230 next restores the specified stub file (S1230). Specifically, the deduplication canceling module 230 refers to the block management table 410 of the original file referred to by this stub file in question to copy data blocks of the original file. In the case where the block management table 410 is not allocated to the stub file, the stub file is newly allocated the block management table 410 and the copying is executed. After finishing copying, the deduplication canceling module 230 stores "−1" as the original file ID 550 of the stub file. An adjustment of the distributed capacity consumption that accompanies the restoration of the stub file is done in the distributed capacity consumption calculating processing, which is described later, and the size of the copied data blocks 420 is therefore not counted.

The deduplication canceling module 230 next subtracts 1 from the stub file count 560 of the original file (S1240), and determines whether or not the stub file count 560 after the subtraction is 0 (S1250).

In the case where the stub file count 560 after the subtraction is 0 (YES in S1250), the deduplication canceling module 230 deletes the original file (S1260), deletes an entry relevant to this original file from the hash management table 600 (S1270), and ends the processing.

In the case where the stub file count 560 after the subtraction is not 0 (NO in S1250), on the other hand, the deduplication canceling module 230 ends the processing without doing anything.

Figure 13:
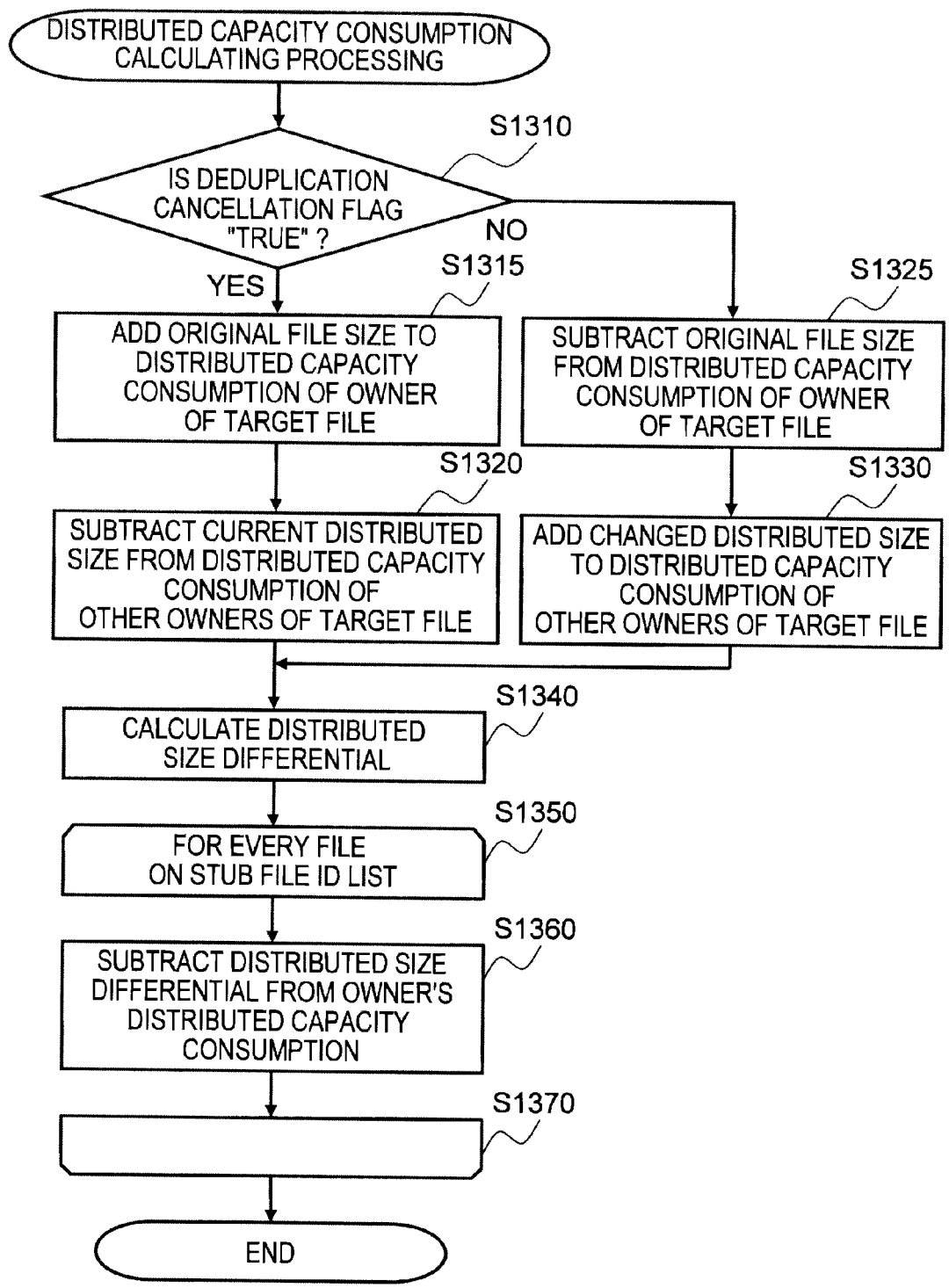
FIG. 13 is a flow chart of an example of the distributed capacity consumption calculating processing according to the first embodiment of this invention.

FIG. 13 is a flow chart of an example of the distributed capacity consumption calculating processing.

The distributed capacity consumption calculating processing illustrated in FIG. 13 is processing that is executed by the distributed capacity consumption calculating module 235 in cooperation with the processor 130, and is executed with a call from the deduplication module 210 or a call from the deduplication canceling module 230 as a trigger.

The distributed capacity consumption calculating module 235 first determines whether or not the deduplication cancellation flag specified as an argument is "true" (S1310). In the case where the deduplication cancellation flag is "true", it means that the distributed capacity consumption calculating module 235 is being called from the deduplication canceling module 230. In the case where the deduplication cancellation flag is "false", on the other hand, it means that the distributed capacity consumption calculating module 235 is being called from the deduplication module 210.

When the deduplication cancellation flag is "false" (NO in S1310), the distributed capacity consumption calculating module 235 subtracts the size 540 of the original file from the distributed capacity consumption 740 in an entry of the quota management table 700 for the owner of the target file specified as an argument (S1325).

The distributed capacity consumption calculating module 235 then calculates the changed distributed size, and adds the calculated distributed size to the distributed capacity consumption 740 in entries of the quota management table 700 for other owners of the target file specified as an argument (S1330). The changed distributed size is, for example, a value obtained by dividing the size 540 of the original file by the changed stub file count.

The distributed capacity consumption calculating module 235 then calculates a distributed size differential (S1340). The distributed size differential is a difference between the distributed size based on the current stub file count and the distributed size based on the changed stub file count. In short, the distributed size differential is calculated by Expression (1). In the case where one of the current stub file count and the changed stub file count is 0, the distributed size differential is 0.

$$D = S/N\text{new} - S/N\text{old} \qquad \text{Expression (1)}$$

D: distributed size differential
S: original file size
Nnew: changed stub file count
Nold: current stub file count The distributed capacity consumption calculating module 235 next searches the hash management table 600 by using the file ID of the original file which is referred to by the target file, and obtains the stub file ID list 630 of this original file. The distributed capacity consumption calculating module 235 executes S1350 to S1370 for every file on the stub file ID list 630.

Specifically, for every file on the stub file ID list 630, the distributed capacity consumption calculating module 235 identifies the user ID of the owner of the file and subtracts the distributed size differential which has been calculated in S1340 from the distributed capacity consumption 740 in an entry of the quota management table 700 that has the identified user ID (S1360). In a context where deduplication is executed, the distributed size differential is a positive value and the distributed capacity consumption 740 therefore decreases. In a context where cancellation of deduplication is executed, the distributed size differential is a negative value and the distributed capacity consumption 740 therefore increases.

After finishing executing S1350 to S1370 for every file on the stub file ID list 630, the distributed capacity consumption calculating module 235 ends the processing.

When the deduplication cancellation flag is "true" (YES in S1310), the distributed capacity consumption calculating module 235 adds the size 540 of the original file to the distributed capacity consumption 740 in an entry of the quota management table 700 for the owner of the target file specified as an argument (S1315).

The distributed capacity consumption calculating module 235 then calculates the current distributed size, and subtracts the calculated distributed size from the distributed capacity consumption 740 in entries of the quota management table 700 for other owners of the target file specified as an argument (S1320). The current distributed size is, for example, a value obtained by dividing the size 540 of the original file by the current stub file count. The subsequent processing from S1340 to S1370 is the same as in the case where the deduplication cancellation flag is "true".

The flow chart of FIG. 13 is an example. When deduplication is executed, a differential between the file size prior to the deduplication and the distributed size after the deduplication is subtracted from the distributed capacity consumption of a user having a file that is the target of the deduplication. Further, for each of users who have other files processed by deduplication that refer to the same original file as the file processed by this deduplication, a distributed size differential that is generated by the new addition of a file that refers to the original file is reflected on the distributed capacity consumption of the user.

When deduplication is cancelled, on the other hand, a differential between the file size prior to the deduplication and the distributed size after the deduplication is added to the distributed capacity consumption of a user having a file for which deduplication is cancelled. Further, for each of users who have other files processed by deduplication that refer to the same original file as the file for which deduplication is cancelled, a distributed size differential that is generated by the new loss of a file that refers to the original file is reflected on the distributed capacity consumption of the user. As long as these processing procedures are executed, the distributed capacity consumption calculating processing may have different processing steps.

Figure 14:
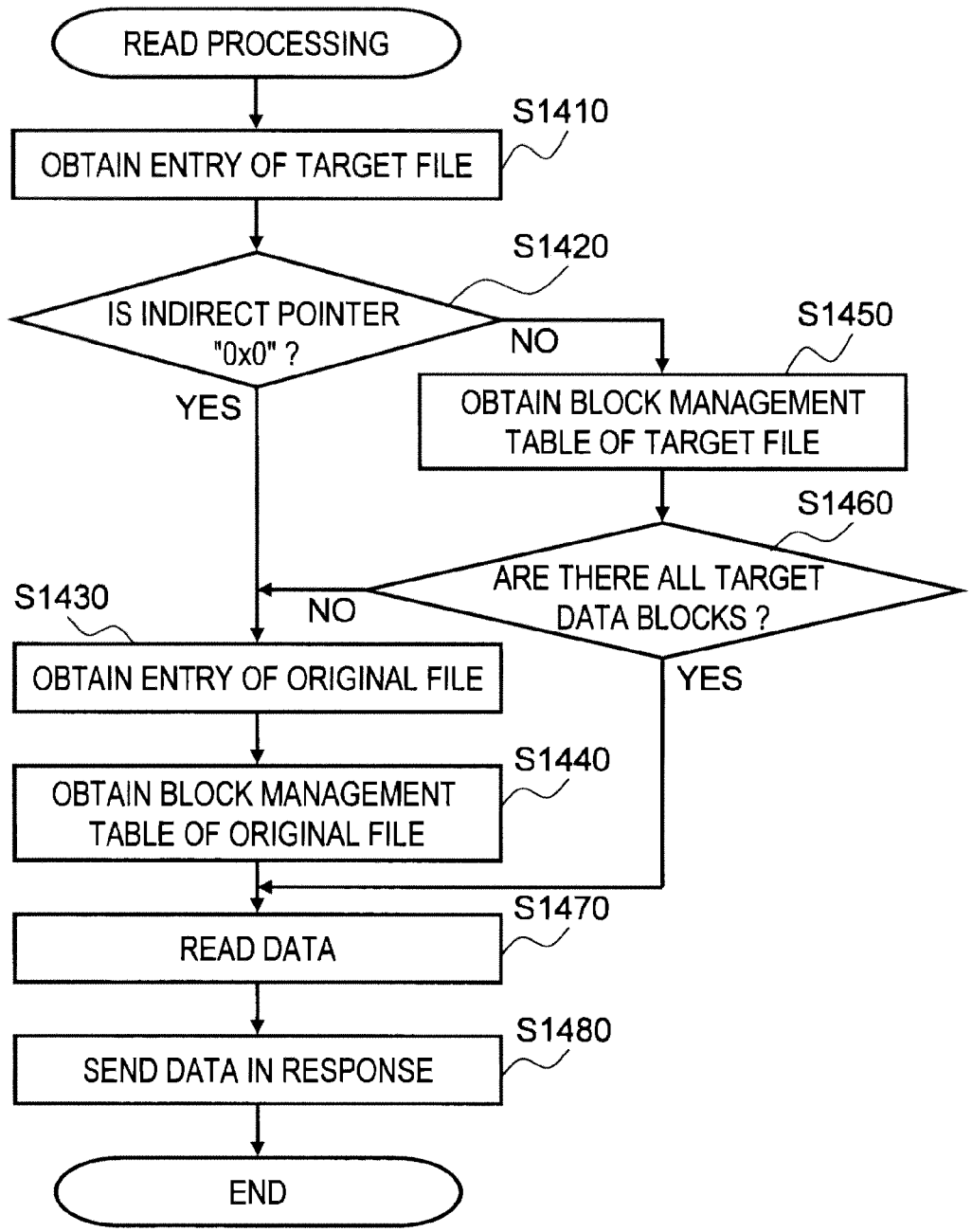
FIG. 14 is a flow chart of an example of read processing according to the first embodiment of this invention.

FIG. 14 is a flow chart of an example of read processing.

The read processing illustrated in FIG. 14 is processing that is executed by the read module 310 in cooperation with the processor 130, and is executed with a read request as a trigger. The read request is issued, for example, by the file server program 165 to the file system program 300 in order to enable a user utilizing the file sharing service to read data of a file stored in the file system 400. The read request contains, as arguments, the file ID 510, an offset which is the start point of data to be read, and the size of the data to be read.

The read module 310 first searches the file management table 500 by using the file ID 510, and obtains the entry of the file to be read (S1410).

The read module 310 determines whether or not the indirect pointer 570 of the obtained entry is "0x0" (S1420).

When the indirect pointer 570 is "0x0" (YES in S1420), the read module 310 searches the file management table 500 by using the original file ID 550 of the file to be read, and obtains the entry of the original file (S1430).

The read module 310 refers to the indirect pointer 570 of the obtained entry of the original file to obtain the block management table 410 of the original file.

The read module 310 then identifies the range of necessary data blocks from the offset and size given as arguments, and reads data out of the identified data blocks (S1470).

Lastly, the read module 310 sends the read data to the file server program 165 in response (S1480), and ends the processing.

When the indirect pointer 570 is not "0x0" (NO in S1420), on the other hand, the read module 310 refers to the indirect pointer 570 to obtain the block management table 410 of the target file (S1450).

The read module 310 refers to the block management table 410 to determine whether or not there are all data blocks identified from the offset and size given as arguments out of which data is to be read (S1460).

In the case where there are all data blocks (YES in S1460), the read module 310 refers to the block management table 410 of the file to be read and reads the data to be read (S1470).

In the case where some of the data blocks are not present (NO in S1460), the read module 310 obtains the block management table 410 of the original file (S1430 to S1440), refers to the block management table 410 of the target file and the block management table 410 of the original file both, and reads the data to be read (S1470).

Figure 15:
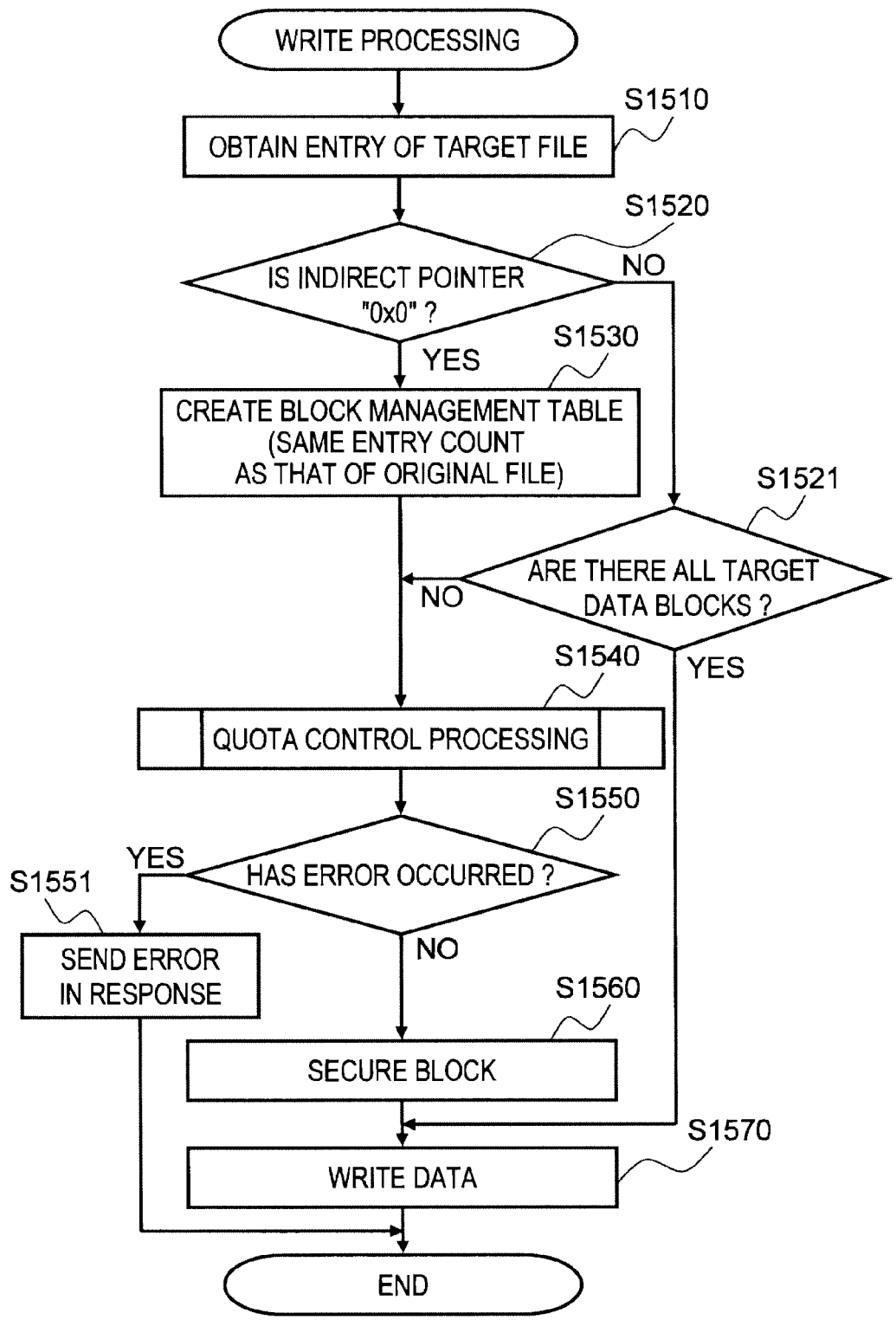
FIG. 15 is a flow chart of an example of write processing according to the first embodiment of this invention.

FIG. 15 is a flow chart of an example of write processing.

The write processing illustrated in FIG. 15 is processing that is executed by the write module 320 in cooperation with the processor 130, and is executed with a write request as a trigger. The write request is issued, for example, by the file server program 165 to the file system program 300 in order to enable a user utilizing the file sharing service to write data to a file stored in the file system 400. The write request contains, as arguments, the file ID 510, an offset which is the start point of data to be written, the size of the data to be written, and the data to be written.

The write module 320 first searches the file management table 500 by using the file ID 510, and obtains the entry of the file to which the data is to be written (S1510).

The write module 320 determines whether or not the indirect pointer 570 of the obtained entry is "0x0" (S1520).

When the indirect pointer 570 is "0x0" (YES in S1520), the write module 320 newly creates the block management table 410 (S1530). In the newly created block management table 410, the write module 320 creates as many entries as the entry count in the block management table 410 of an original file which is referred to by the target file (the block address 411 is "0x0" in each created entry).

The write module 320 then calls quota control processing by specifying, as arguments, the file ID 510, the offset which is the start point of the data to be written, and the size of the data to be written (S1540).

The write module 320 then determines whether or not an error has occurred in the quota control processing (S1550).

In the case where an error has occurred in the quota control processing (YES in S1550), the write module 320 sends the error in response (S1551) and ends the processing.

In the case where no error has occurred in the quota control processing (NO in S1550), the write module 320 secures the necessary data blocks 420 that are identified from the offset and size given as arguments (S1560). Thereafter, a block address is stored in a relevant entry of the block management table 410. No new data block 420 is secured for an entry in which a block address is already stored.

After securing necessary data blocks, the write module 320 writes the data contained in the request (S1570), and ends the processing.

When the indirect pointer 570 is not "0x0" (NO in S1520), on the other hand, the write module 320 refers to the indirect pointer 570 to obtain the block management table 410. The write module 320 refers to the block management table 410 to determine whether or not there are all data blocks identified from the offset and size given as arguments to which the data is to be written (S1521).

In the case where there are all data blocks already (YES in S1521), the write module 320 does not need to newly secure the data blocks 420. Therefore, the write module 320 writes the data contained in the request (S1570), and ends the processing.

In the case where some of the data blocks are not present (NO in S1521), on the other hand, the write module 320 needs to newly secure the data blocks 420. Therefore, after the quota control processing (S1540), the write module 320 secures the data blocks 420 (S1560) and writes the desired data (S1570).

Figure 16:
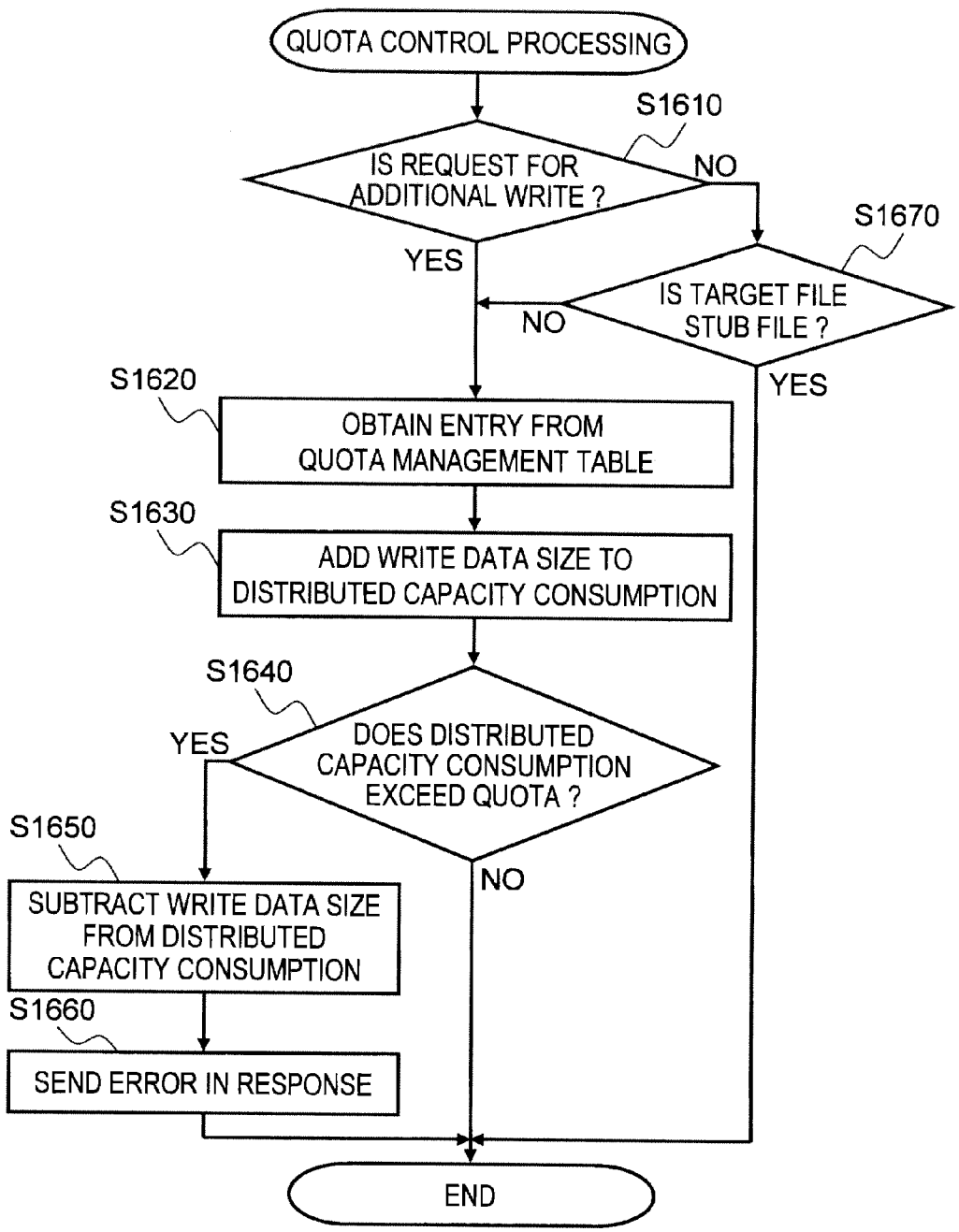
FIG. 16 is a flow chart of an example of the quota control processing according to the first embodiment of this invention.

FIG. 16 is a flow chart of an example of the quota control processing.

The quota control processing illustrated in FIG. 16 is processing that is executed by the quota control module 330 in cooperation with the processor 130, and is executed with a call from the write module 320 as a trigger.

The quota control module 330 first determines whether or not the write request is for additional write. Additional write is to write data in a location corresponding to an entry that does not exist in the block management table 410. Accordingly, whether or not a request is for additional write can be determined by obtaining the block management table 410 of the file in question with the use of the file ID 510 given as an argument, and then referring to each entry based on the requested offset and size.

When the write request is for additional write (YES in S1610), the quota control module 330 obtains an entry corresponding to the owner of the target file from the quota management table 700 (S1620).

The quota control module 330 adds the size of the data to be written to the distributed capacity consumption 740 of the entry obtained in S1620 (S1630).

The quota control module 330 determines whether or not the distributed capacity consumption 740 exceeds the quota 750 at this point (S1640).

In the case where the distributed capacity consumption 740 exceeds the quota 750 (YES in S1640), the quota control module 330 subtracts from the distributed capacity consumption 740 the size of the written data which has been added in S1630, sends, in response, an error that indicates consumption that exceeds the quota (S1660), and ends the processing.

In the case where the distributed capacity consumption 740 does not exceed the quota 750 (NO in S1640), the quota control module 330 immediately ends the processing.

When the write request is not for additional write (NO in S1610), on the other hand, the quota control module 330 determines whether or not the target file is a stub file generated as a result of deduplication (S1670).

When the target file is a stub file (YES in S1670), it means that the distributed capacity consumption 740 is already counted at the time of deduplication, and the quota control module 330 therefore immediately ends the processing.

When the target file is not a stub file (NO in S1670), the quota control module 330 executes S1620 to S1660 as in the case where the write request is for additional write to perform processing of reflecting the size of the data to be written on the quota management table 700.

In the processing of the write module 320 and the processing of the quota control module 330 which are illustrated in FIG. 15 and FIG. 16, respectively, a differential between the original file and a stub file is not counted in as the distributed capacity consumption 740, except for the case of additional write. For instance, the capacity of the data "X" in the file 830 of FIG. 8 is not counted whereas the capacity of the data "Y" is counted. This is based on the idea that a differential between the original file and a stub file is already counted as the distributed size (a value obtained by dividing the size of the original file by the stub file count).

If S1610 and S1670 are changed, for example, a differential between the original file and a stub file may be counted in as the distributed capacity consumption 740 irrespective of whether or not the request is for additional write. However, there is a possibility that, when a differential between the original file and a stub file increases, adding the differential and the distributed size causes the distributed capacity consumption 740 of the file in question to exceed the logical file size. The logical file size therefore may be set as an upper limit. Alternatively, the deduplication canceling module 230 may be executed automatically to dissolve a deduplication relation, with the logical file size being exceeded as a trigger.

As described above, according to the first embodiment, the capacity consumption of the owner of a file processed by deduplication (a stub file) can be counted appropriately in capacity management of a file server that has a deduplication function.

Example 2

A second embodiment of this invention is described next. The following description focuses on differences from the first embodiment, and descriptions on points common to the first embodiment and the second embodiment are omitted or simplified.

In the second embodiment, distributed capacity consumption calculating processing is simplified by calculating the distributed capacity consumption in write processing in order to speed up deduplication processing and deduplication canceling processing.

A computer system of the second embodiment has the same configuration as that of the computer system of the first embodiment described above. However, the specifics of processing of the deduplication program 200 and the file system program 300 are different in the second embodiment.

A deduplication program 1700 of the second embodiment has a distributed capacity consumption calculating module that does not execute S1340 to S1370 of FIG. 13, unlike the processing in the first embodiment. Instead, a deduplication module of the deduplication program 1700 stores the stub file count of the original file as the stub file count 560 of the file management table 500.

Figure 17:
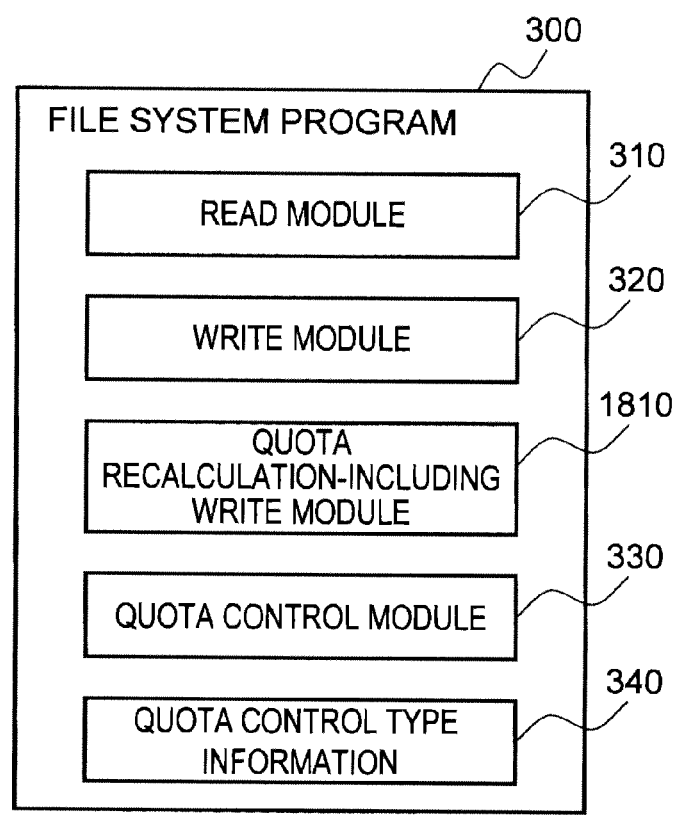
FIG. 17 is a block diagram illustrating a functional configuration of a file system program according to a second embodiment of this invention.

FIG. 17 is a block diagram illustrating a functional configuration of a file system program 1800 of the second embodiment.

The file system program 1800 includes the read module 310, the write module 320, the quota control module 330, the quota control type information 340, and a quota recalculation-including write module 1810. In the file system program 1800, the functions and processing of the read module 310 and the write module 320 are the same as in the first embodiment described above. The quota recalculation-including write module 1810 determines, prior to the processing by the write module 320, whether or not there is inconsistency in an entry of the quota management table 700 for the owner of a file to be written.

Figure 18:
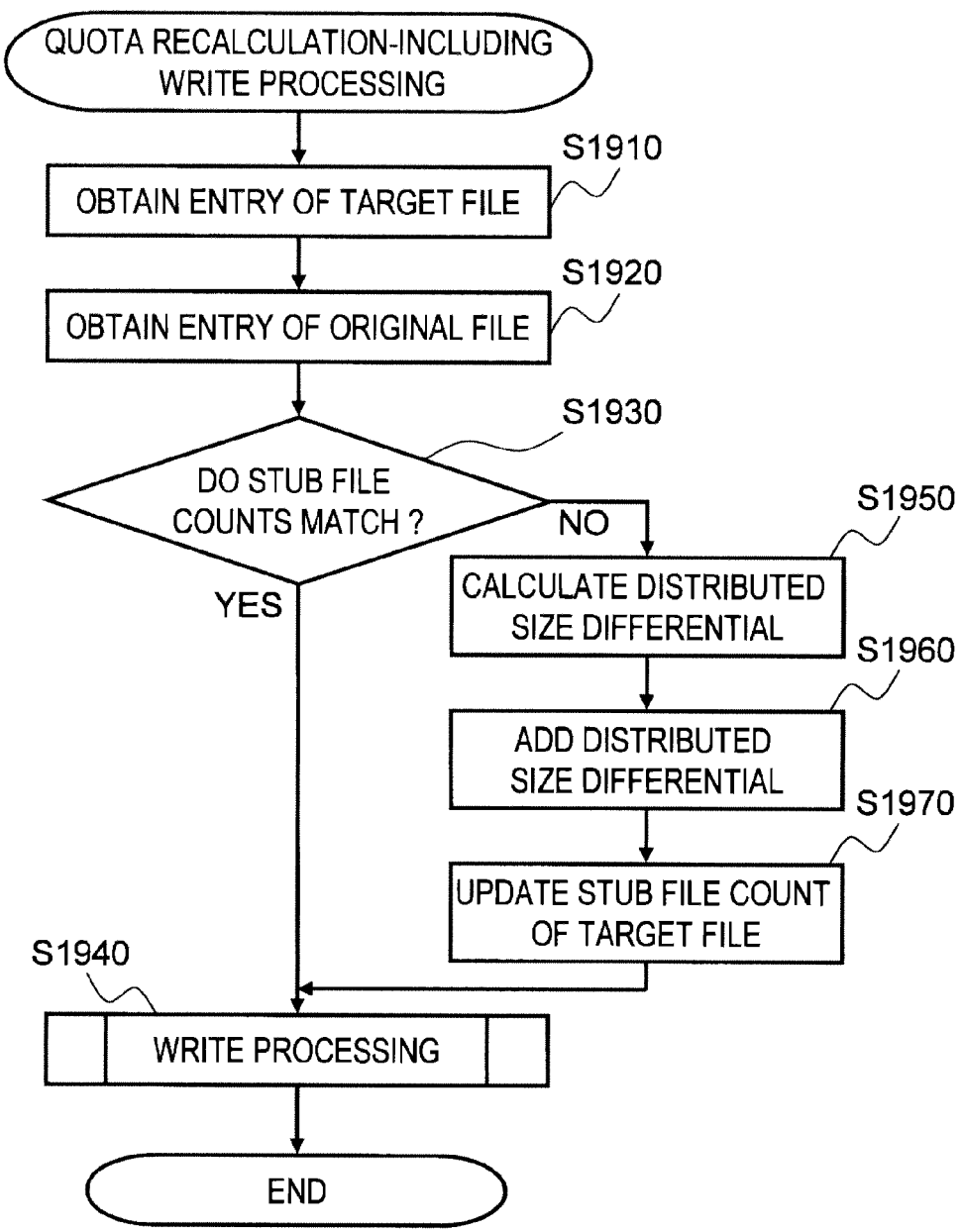
FIG. 18 is a flow chart illustrating an example of quota recalculation-including write processing according to the second embodiment of this invention.

FIG. 18 is a flow chart illustrating an example of quota recalculation-including write processing.

The quota recalculation-including write processing illustrated in FIG. 18 is processing that is executed by the quota recalculation-including write module 1810 in cooperation with the processor 130. Arguments given to the quota recalculation-including write module 1810 are the same as those given to the write module 320.

The quota recalculation-including write module 1810 first searches the file management table 500 by using the file ID 510 that has been given as an argument, and obtains an entry of the file in question (S1910).

The quota recalculation-including write module 1810 next searches the file management table 500 by using the original file ID 550 of the obtained entry, and obtains the relevant entry (S1920).

The quota recalculation-including write module 1810 then determines whether or not the stub file count 560 of the target file and the stub file count 560 of the original file match each other (S1930).

When the stub file counts match (YES in S1930), it means that no inconsistency is found in the entry of the owner of the file to be written, and the quota recalculation-including write module 1810 therefore calls the write module 320 to execute normal write processing (S1940).

When the stub file counts do not match (NO in S1930), the quota recalculation-including write module 1810 calculates a distributed size differential with the stub file count 560 of the original file as the changed stub file count and the stub file count 560 of the target file as the current stub file count (S1950).

Then, the quota recalculation-including write module 1810 adds the distributed size differential that has been calculated in S1950 (S1960).

The quota recalculation-including write module 1810 further rewrites the stub file count 560 of the target file with the stub file count of the original file (S1970), and calls the write module 320 to execute normal write processing (S1940).

As described above, according to the second embodiment, the capacity consumption of the owner of a file processed by deduplication (a stub file) can be counted appropriately in capacity management of a file server that has a deduplication function, while executing deduplication processing and deduplication canceling processing at high speed.

Example 3

A third embodiment of this invention is described next. The following description focuses on differences from the first embodiment, and descriptions on points common to the first embodiment and the third embodiment are omitted or simplified.

In the third embodiment, the provider of the file sharing service charges each end user an amount of money that is determined by how much system file capacity the end user uses. The third embodiment enables the administrator to display logical capacity consumption, distributed capacity consumption, and a profit on the service provider side and to set a return rate so that the service provider can give back a part of benefits of deduplication to end users.

Figure 19:
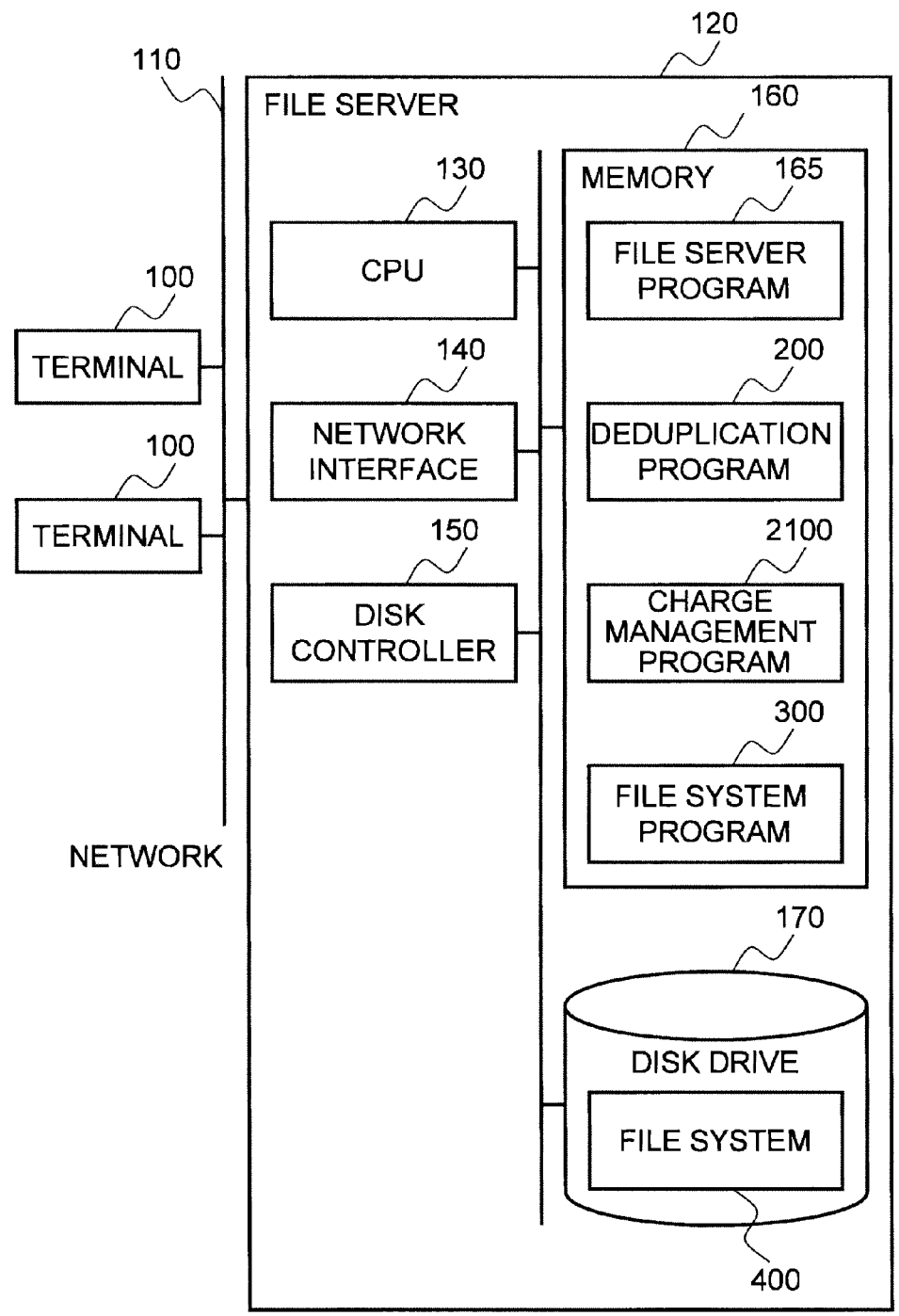
FIG. 19 is a block diagram illustrating a configuration of a computer system of a third embodiment according to a third embodiment of this invention.

FIG. 19 is a block diagram illustrating a configuration of a computer system of the third embodiment.

The computer system of the third embodiment includes a charge management program 2100 in addition to the components of the computer system of the first embodiment. The charge management program 2100 displays the overall utilization situation of the file system and a utilization situation observed on an end user-by-end user basis to the service provider. The charge management program 2100 further calculates the charging status of end users and a profit of the service provider to display results of the calculation.

Figures 20, 21:
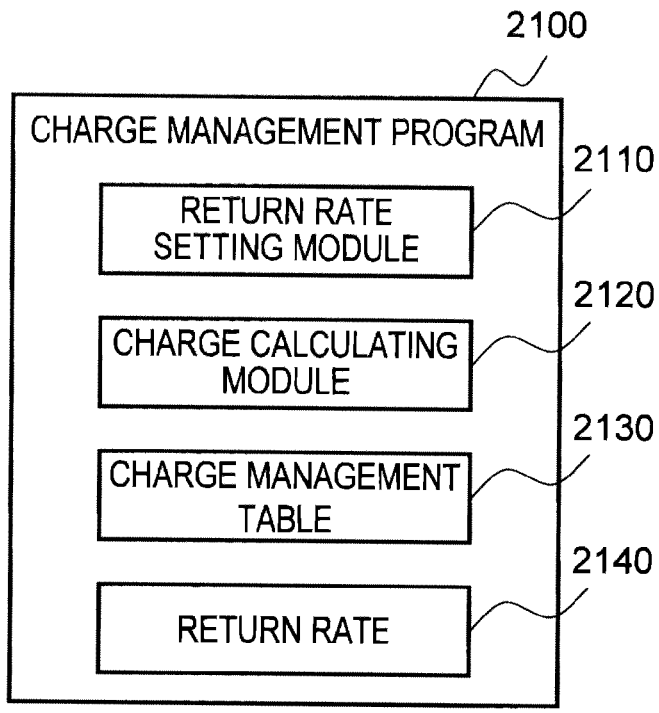
FIG. 20 is a block diagram illustrating a functional configuration of the charge management program according to the third embodiment of this invention.
FIG. 21 is a diagram illustrating an example of a configuration of the charge management table according to the third embodiment of this invention.

FIG. 20 is a block diagram illustrating a functional configuration of the charge management program 2100.

The charge management program 2100 includes a return rate setting module 2110, a charge calculating module 2120, a charge management table 2130, and a return rate 2140.

The return rate setting module 2110 is executed by the processor 130 of the file server 120 when instructed by the service provider. The return rate setting module 2110 displays a return rate setting window 2300 (illustrated in FIG. 22) on the terminal 100 in the form of, for example, a graphical user interface (GUI), and sets the return rate 2140 based on an input from the service provider.

The charge calculating module 2120 is executed by the processor 130 of the file server 120 when instructed by the service provider, or on a predetermined schedule. The charge calculating module 2120 updates an estimated charge 2230 (illustrated in FIG. 21) of the charge management table 2130 with the use of a unit capacity cost, which is determined based on the logical capacity consumption 730 of each end user, the logical capacity consumption 730, and the return rate 2140. The unit capacity cost is determined in advance, for example, 1 $ every month per GB in the case where the logical capacity consumption 730 is 5 GB or less, and 0.5 $ every month per GB in the case where the logical capacity consumption 730 exceeds 5 GB. The estimated charge 2230 is calculated by, for example, Expression (2).

$$B = (L - (L-D)*R)*P \qquad \text{Expression (2)}$$

B: estimated charge
L: logical capacity consumption
D: distributed capacity consumption
R: return rate
P: unit capacity cost The charge management table 2130 is for managing a unit capacity cost and an estimated charge on an end user-by-end user basis. The charge management table 2130 is used by the return rate setting module 2110 and the charge calculating module 2120.

As the return rate 2140, a currently set return rate is held. The return rate 2140 is used by the return rate setting module 2110 and the charge calculating module 2120.

FIG. 21 is a diagram illustrating an example of a configuration of the charge management table 2130.

The charge management table 2130 is configured so that one entry is constituted of a user ID 2210, a unit capacity cost 2220, and the estimated charge 2230. The user ID 2210 is an identifier for uniquely identifying a user who is charged. The unit capacity cost 2220 is a cost per capacity determined by the logical capacity consumption 730 of the user in question. The estimated charge 2230 is an estimated charge to the user in question which is calculated by the charge calculating module 2120.

Figure 22:
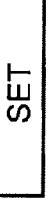
FIG. 22 is a diagram illustrating an example of the return rate setting window according to the third embodiment of this invention.

FIG. 22 is a diagram illustrating an example of the return rate setting window 2300.

The return rate setting window 2300 is an window displayed on the terminal 100 by the return rate setting module 2110 based on an instruction from the service provider. The return rate setting window 2300 is used by the service provider to check the overall utilization situation of the file system, benefits of deduplication, the situation of giving back benefits of deduplication to end users, and a profit, and to change the return rate.

The return rate setting window 2300 includes display fields for a total capacity 2310, total physical capacity consumption 2311, and total logical capacity consumption 2312. The total capacity 2310 is information about the overall utilization situation of the file system, and indicates the capacity of the entire file system. The total physical capacity consumption 2311 is the sum of physical capacity consumption values of all users. The total logical capacity consumption 2312 is the sum of logical capacity consumption values of all users.

The return rate setting window 2300 also includes display fields for a current profit 2313, a changed profit 2314, and a return rate 2315, and an input field for a changed return rate 2316. The current profit 2313 is the current profit of the service provider, and the changed profit 2314 is a profit calculated based on a changed return rage. The return rate 2315 is the rate of giving back benefits of deduplication to end users. The changed return rate 2316 is displayed in the form of a text box in which the service provider can make an input.

The return rate setting window 2300 also includes, as information displayed on an end user-by-end user basis, a user ID 2320, physical capacity consumption 2321, logical capacity consumption 2322, distributed capacity consumption 2323, an exploited capacity 2324, a return capacity 2325, and a unit capacity cost 2326.

The return rate setting window 2300 further includes a button 2330, which is operated in order to set a value that is input as the changed return rate 2316 to the return rate 2140.

Displayed as the current profit 2313 is a value that is obtained by subtracting all costs required to run the file sharing service from the sum of estimated charges of end users that is calculated by Expression 2 with the use of the return rate 2315. Displayed as the changed profit 2314 is a value that is obtained by subtracting all costs required to run the file sharing service from the sum of estimated charges of end users that is calculated by Expression 2 with the use of the changed return rate 2316. Desirably, the changed profit 2314 is recalculated each time the changed return rate 2316 is changed, to thereby display a new value as the changed profit 2314.

The user ID 2320, the physical capacity consumption 2321, the logical capacity consumption 2322, and the distributed capacity consumption 2323 are displayed by the return rate setting module 2110 by referring to the quota management table 700.

Displayed as the exploited capacity 2324 is a value that is obtained by the return rate setting module 2110 by subtracting the distributed capacity consumption 2323 from the logical capacity consumption 2322.

The unit capacity cost 2326 is displayed by the return rate setting module 2110 by referring to the charge management table 2130.

As described above, according to the third embodiment, the service provider can give back a part of a profit obtained by deduplication to end users based on distributed capacity consumption, within the range in which the service provider's own profit is ensured, by presenting logical capacity consumption to the end users.

While logical capacity consumption is presented to end users in the third embodiment, the distributed capacity consumption may be used as the capacity consumption presented to end users and in charge calculation in the case where all benefits of deduplication are to be given back to end users.

While the present invention has been described in detail and pictorially in the accompanying drawings, the present invention is not limited to such detail but covers various obvious modifications and equivalent arrangements, which fall within the purview of the appended claims.

For instance, while the description given above deals with capacity management of files processed by deduplication in which a file is shared partially or entirely, this invention is not limited to cases where deduplication processing is executed on a file-by-file basis. This invention is also applicable to cases where deduplication is performed on data that is not in a file format in a given unit (for example, in the unit of blocks).

The invention claimed is:

1. A storage system, comprising:
a storage device configured to store data; and
a controller configured to control data read/write in the storage device, wherein the controller includes:
a processor configured to execute a program; and
a memory configured to store the program that is executed by the processor, and
wherein the processor is configured to:
execute deduplication processing for converting a duplicate part of data stored in the storage device into shared data;
calculate a distributed capacity consumption, which represents a capacity of a storage area that is used by a user in the storage device, by using a distributed size of the data prior to the deduplication processing and a count of pieces of data referring to the shared data referred to by the data;
subtract a differential between a data size of the data stored in the storage device that are a target of the deduplication processing and the distributed size of the data after the deduplication processing from the distributed capacity consumption of the user; and
subtract a distributed data differential that is calculated by newly performing deduplication on the data that are the target of the deduplication processing from distributed capacity consumption of the other user who holds other pieces of data referring to the shared data referred to by the data that are the target of the deduplication processing.

2. The storage system according to claim 1, wherein the processor is configured to calculate the distributed size by dividing the size of the data prior to the deduplication processing by the count of pieces of data referring to the shared data referred to by the data.

3. The storage system according to claim 1,
wherein an upper limit is determined for the capacity of the storage area that is used by the user, and
wherein the processor is configured to use the calculated distributed capacity consumption to manage at least one of the capacity of the storage area that is used by the user and a free capacity of the storage device that is available to the user.

4. The storage system according to claim 1, wherein the processor is configured to:
not add a size of data to be written to the distributed capacity consumption in a case where a data write request for overwrite of the data processed by the deduplication processing is received; and
add the size of the data to be written to the distributed capacity consumption in a case where a data write request of other types is received.

5. The storage system according to claim 4, wherein the processor is configured to calculate the distributed capacity consumption with the size of the data prior to the deduplication processing as an upper limit.

6. The storage system according to claim 5, wherein the processor is configured to execute deduplication canceling processing for dissolving a deduplication relation by deleting a reference to the shared data in a case where the distributed capacity consumption of the data exceeds the size of the data prior to the deduplication processing.

7. The storage system according to claim 1, wherein the processor is configured to use the calculated distributed capacity consumption to calculate a charge to a user who uses the storage system.

8. The storage system according to claim 7, wherein the processor is configured to use a difference between the calculated distributed capacity consumption and the size of the data prior to the deduplication processing to calculate the charge to the user.

9. The storage system according to claim 2, wherein the processor is configured to output data including the calculated distributed capacity consumption and the size of the data prior to the deduplication processing, which are associated with each other.

10. A storage system, comprising:
a storage device configured to store data; and
a controller configured to control data read/write in the storage device,
wherein the controller includes:
a processor configured to execute a program; and a memory configured to store the program that is executed by the processor, and wherein the processor is configured to:
execute deduplication processing for converting a duplicate part of data stored in the storage device into shared data;
calculate a distributed capacity consumption, which represents a capacity of a storage area that is used by a user in the storage device, by using a distributed size of the data prior to the deduplication processing and a count of pieces of data referring to the shared data referred to by the data;
execute deduplication canceling processing for canceling sharing of the duplicate part of the data;
add a differential between the distributed size of the data prior to the deduplication processing canceling processing and the size of the data prior to the deduplication processing to the distributed capacity consumption of the user; and
reflect a distributed data differential that is calculated by newly canceling deduplication of the data that are a target of the deduplication canceling processing on the distributed capacity consumption of the other user who holds other pieces of data referring to the shared data that is referred to by data that are the target of the deduplication canceling processing.

11. A method of controlling a storage system,
the storage system including a storage device configured to store data, and a controller configured to control for controlling data read/write in the storage device,
the controller including a processor configured to execute for executing a program and a memory configured to store the program that is executed by the processor,
the method including steps of:
executing, by the processor, deduplication processing for converting a duplicate part of data stored in the storage device into shared data; and
calculating, by the processor, a distributed capacity consumption, which represents a capacity of a storage area that is used by a user in the storage device, by using a distributed size of the data prior to the deduplication processing and a count of pieces of data referring to the shared data referred to by the data;
subtracting, by the processor, a differential between a data size of the data stored in the storage device that are a target of the deduplication processing and the distributed size of the data after the deduplication processing from the distributed capacity consumption of the user; and
subtracting, by the processor, a distributed data differential that is calculated by newly performing deduplication on the data that are the target of the deduplication processing from distributed capacity consumption of the other user who holds other pieces of data referring to the shared data referred to by the data that are the target of the deduplication processing.

12. The method of controlling a storage system according to claim 11, further comprising calculating, by the processor, the distributed size by dividing the size of the data prior to the deduplication processing by the count of pieces of data referring to the shared data referred to by the data.

13. The method of controlling a storage system according to claim 11,
wherein an upper limit to the capacity of the storage area that is used by the user is determined for the storage system, and
wherein the method includes a step of using, by the processor, the calculated distributed capacity consumption to manage at least one of the capacity of the storage area that is used by the user and a free capacity of the storage device that is available to the user.

14. A storage controller for controlling data read/write in a storage device configured to store data, comprising:
a processor configured to execute a program; and
a memory configured to store the program that is executed by the processor, wherein the processor is configured to:
execute deduplication processing for converting a duplicate part of data stored in the storage device into shared data; and
calculate a distributed capacity consumption, which represents a capacity of a storage area that is used by a user in the storage device, by using a size of the data prior to the deduplication processing and a count of pieces of data referring to the shared data referred to by the data;
subtract a differential between a data size of the data stored in the storage device that are a target of the deduplication processing and the distributed size of the data after the deduplication processing from the distributed capacity consumption of the user; and
subtract a distributed data differential that is calculated by newly performing deduplication on the data that are the target of the deduplication processing from distributed capacity consumption of the other user who holds other pieces of data referring to the shared data that are referred to by the data that are the target of the deduplication processing.

* * * * *